INVENTORS
OLIVER J. TYSVER
HENRY J. KEINANEN &
ERNEST M. GORE
ATTORNEYS

Aug. 19, 1969  O. J. TYSVER ET AL  3,462,015
CONTOUR CHECKING DEVICE
Filed Sept. 28, 1965  13 Sheets-Sheet 2
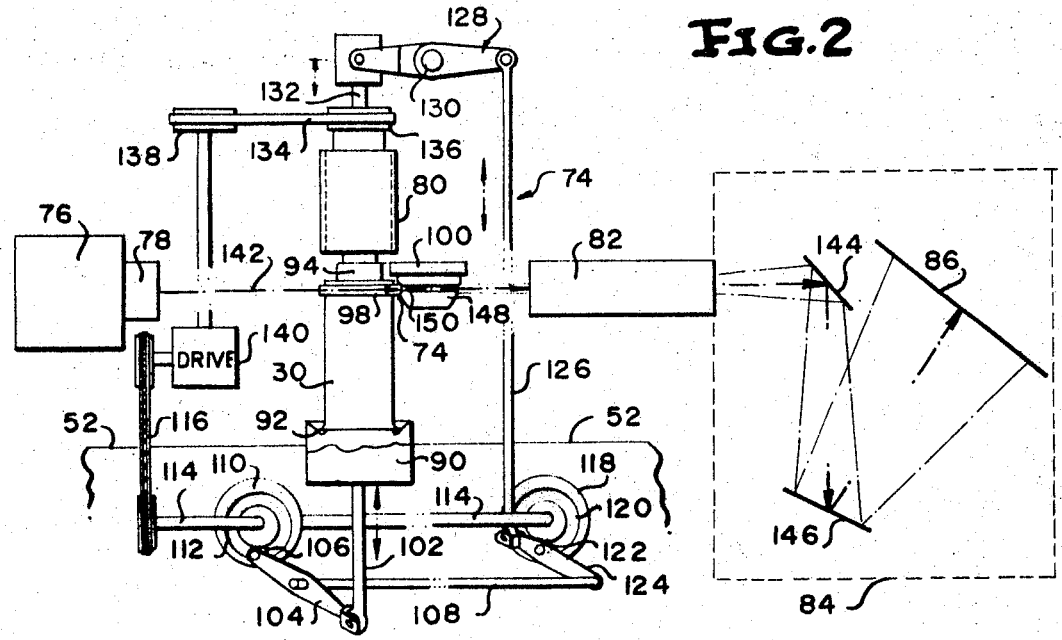
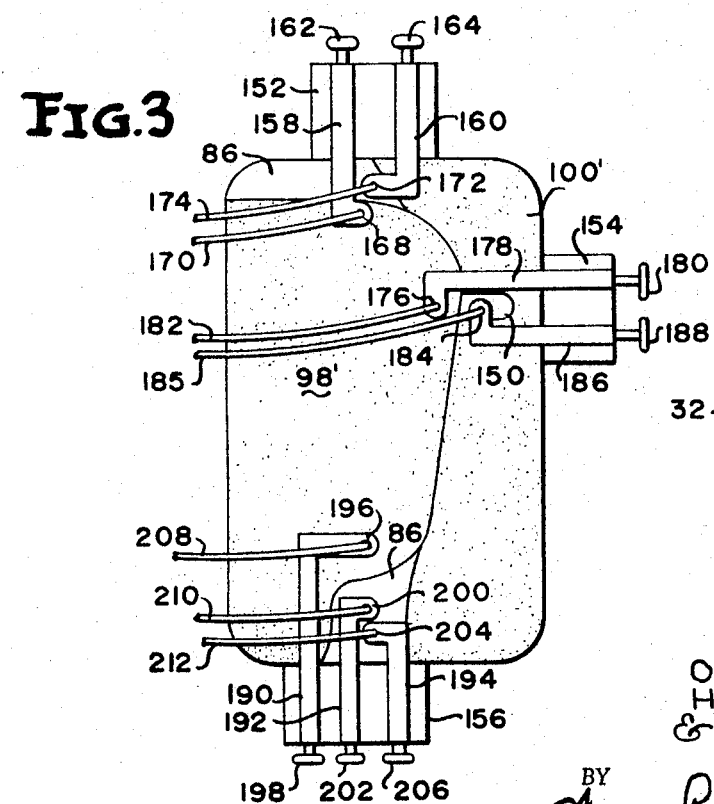
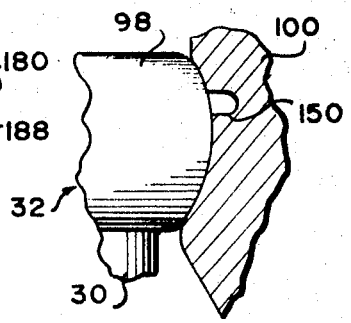
INVENTORS
OLIVER J. TYSVER,
HENRY J. KEINANEN
& ERNEST M. GORE
BY Mason, Porter, Miller & Brown
ATTORNEYS

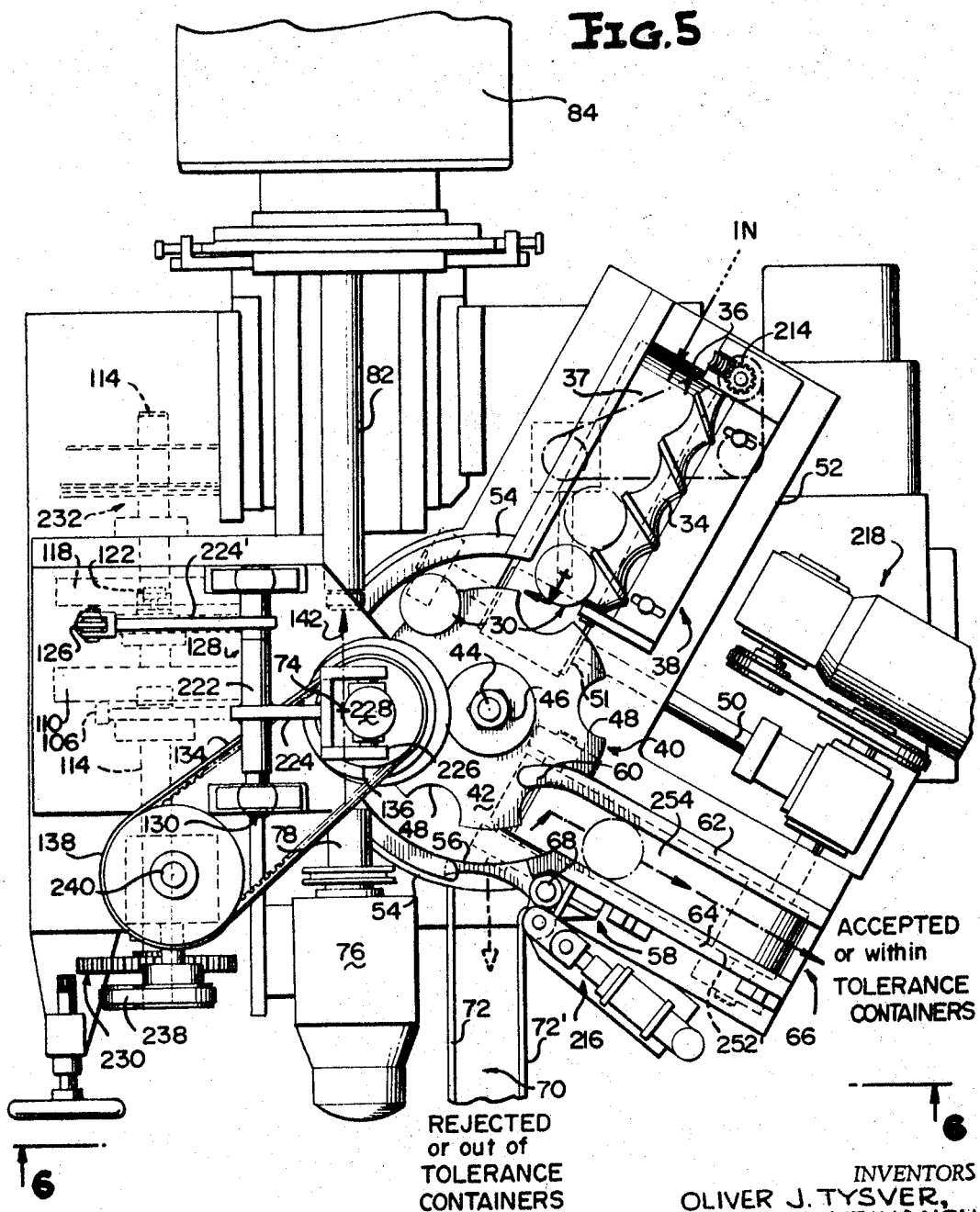

INVENTORS
OLIVER J. TYSVER
HENRY J. KEINANEN
& ERNEST M. GORE

BY Mason, Porter, Diller & Brown
ATTORNEYS

INVENTORS
OLIVER J. TYSVER,
HENRY J. KEINANEN
& ERNEST M. GORE
BY
ATTORNEYS

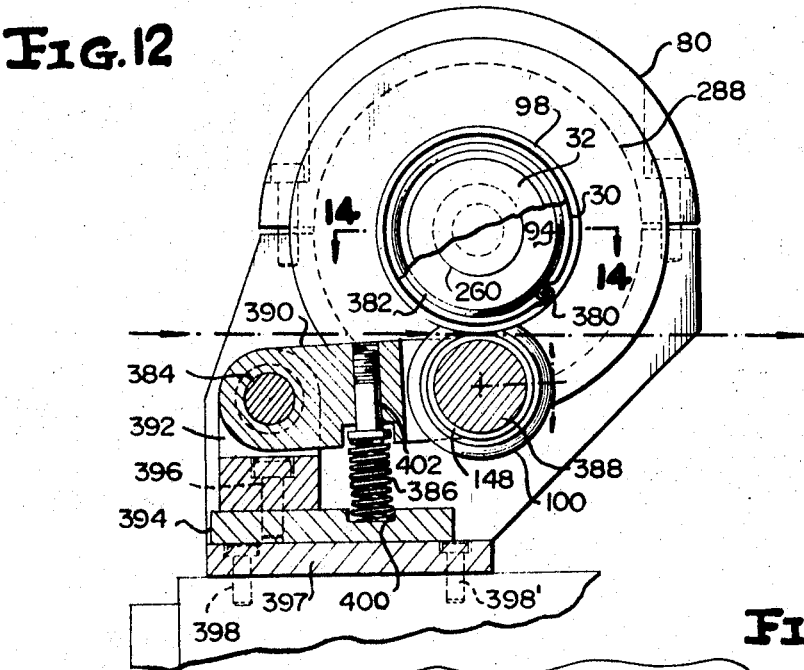
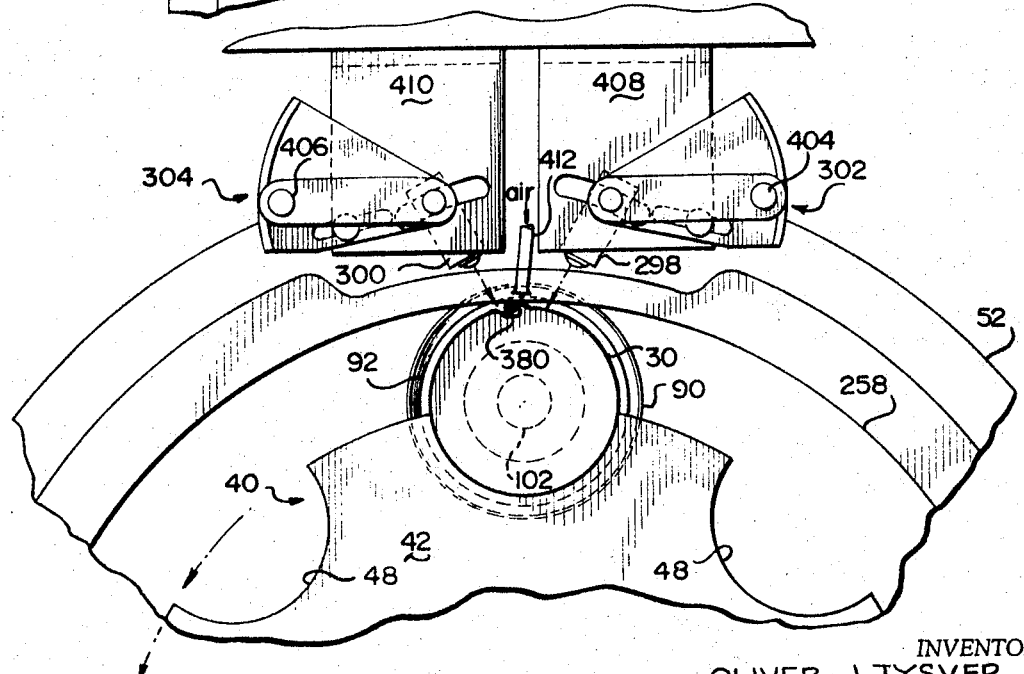

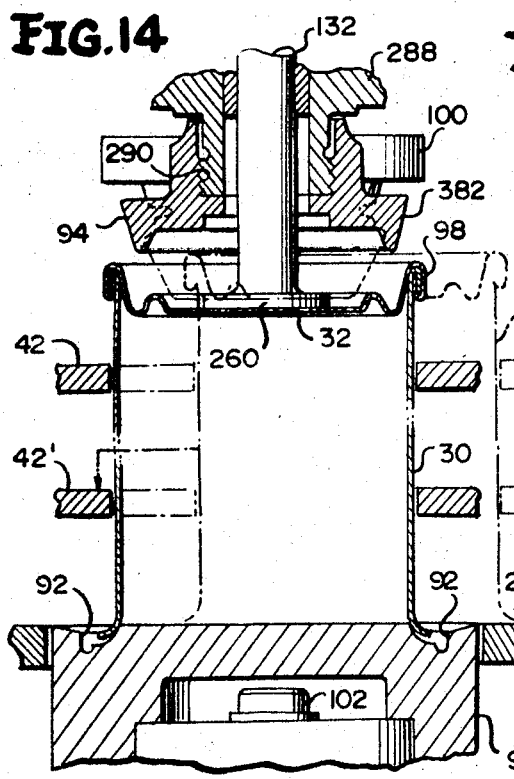
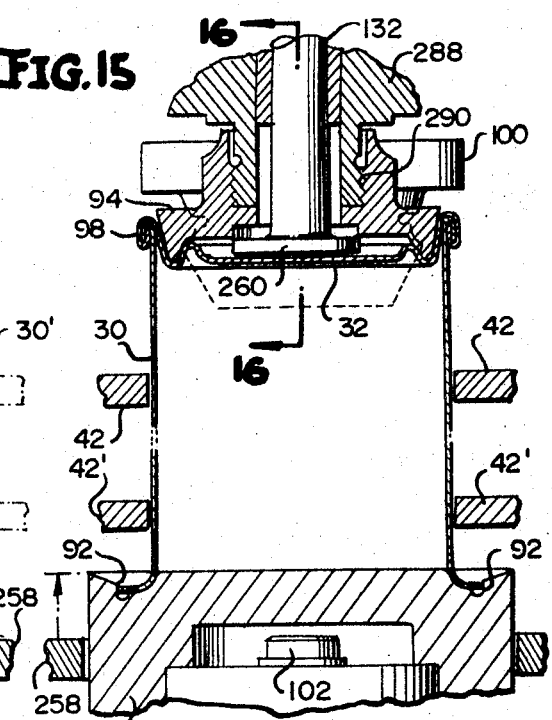
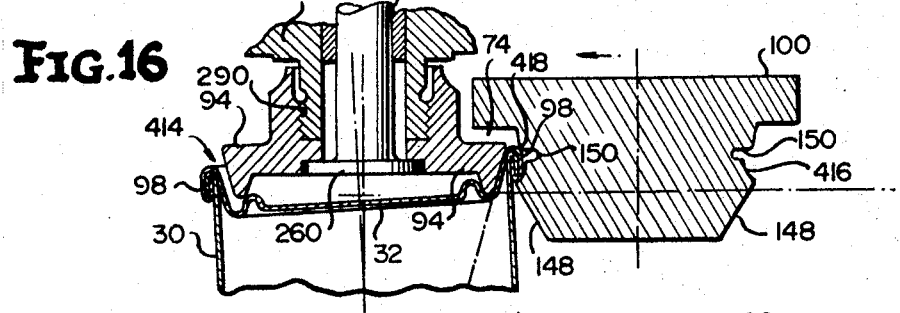
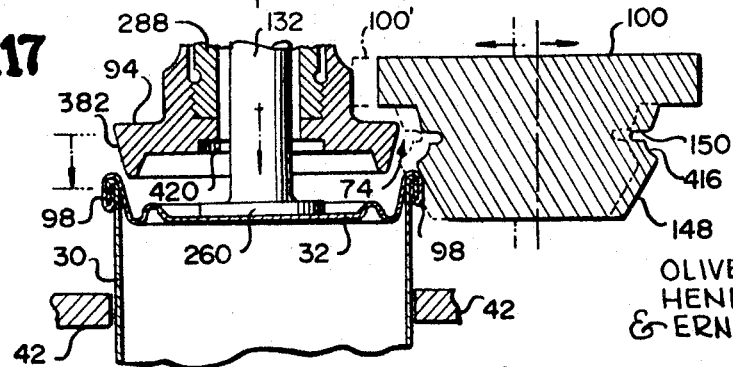
INVENTORS
OLIVER J. TYSVER,
HENRY J. KEINANEN
& ERNEST M. GORE

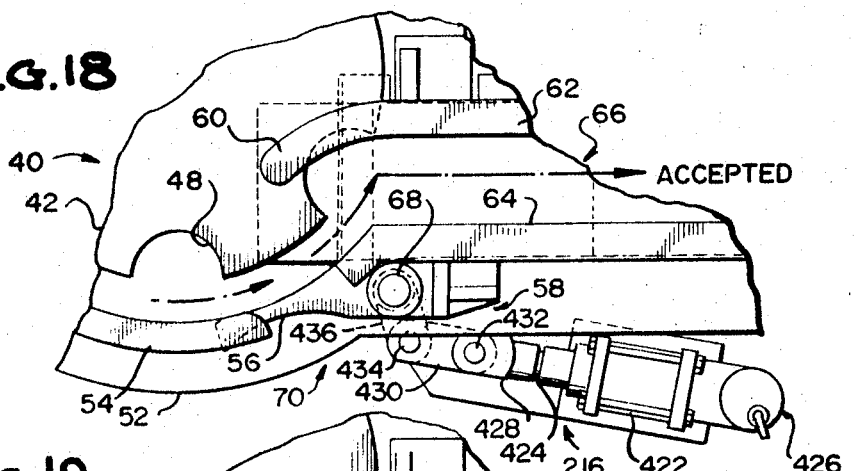
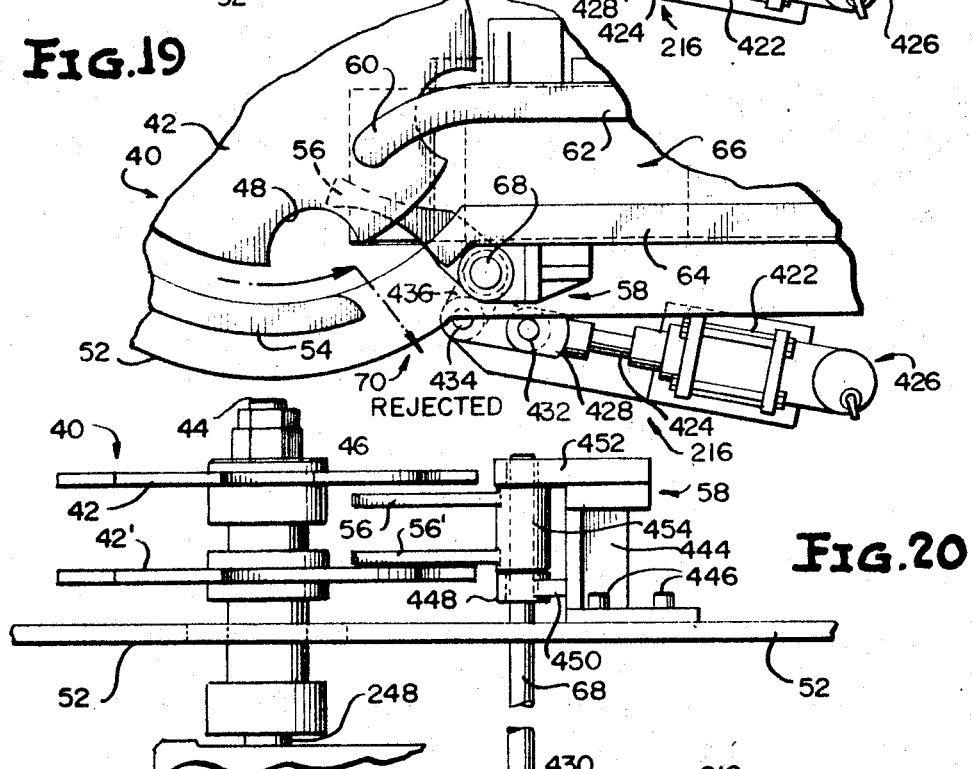
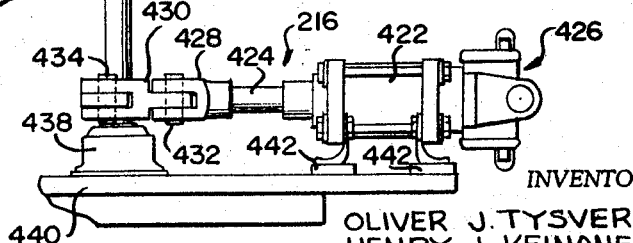
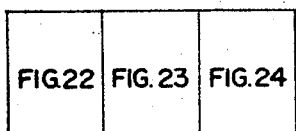

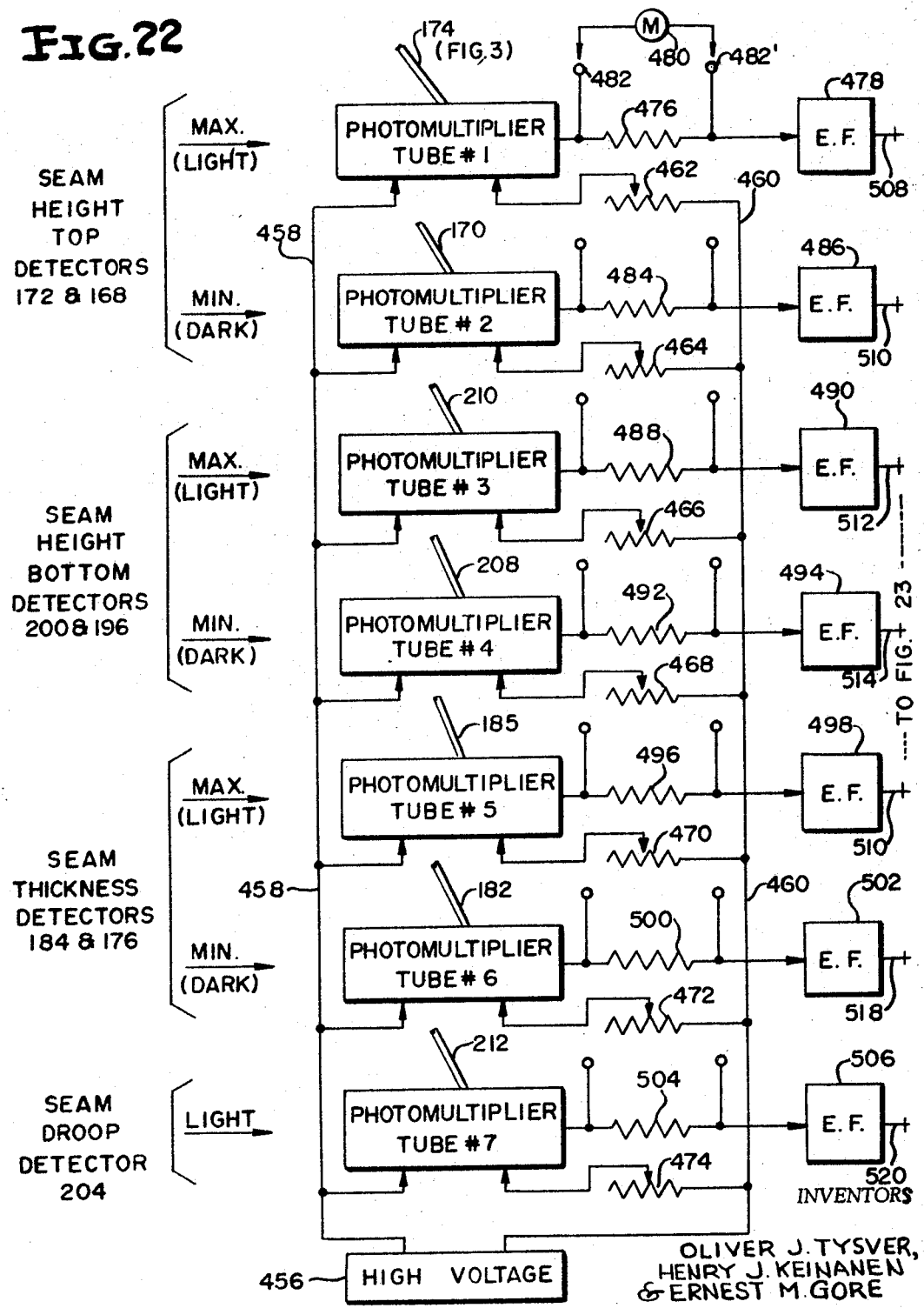

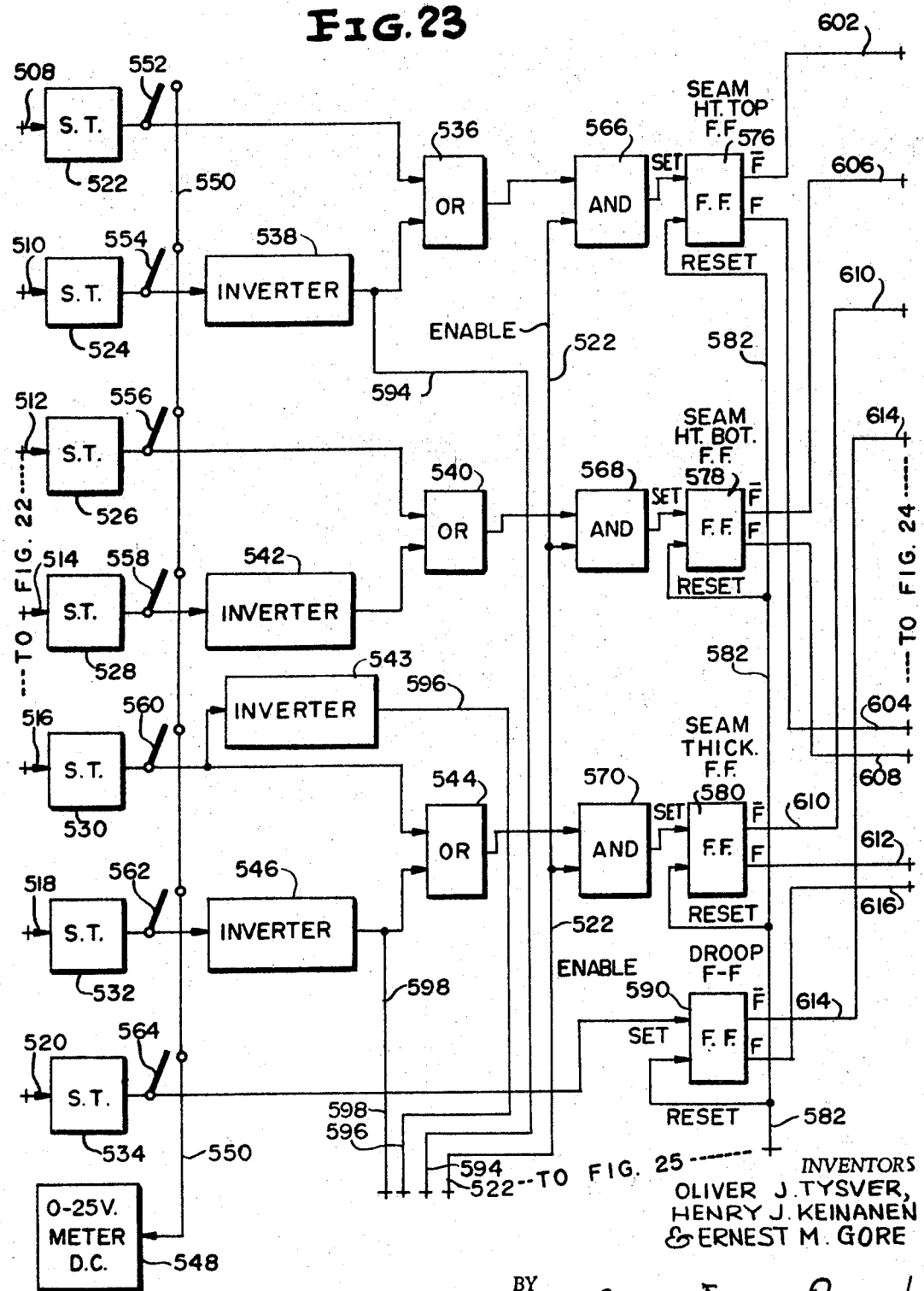

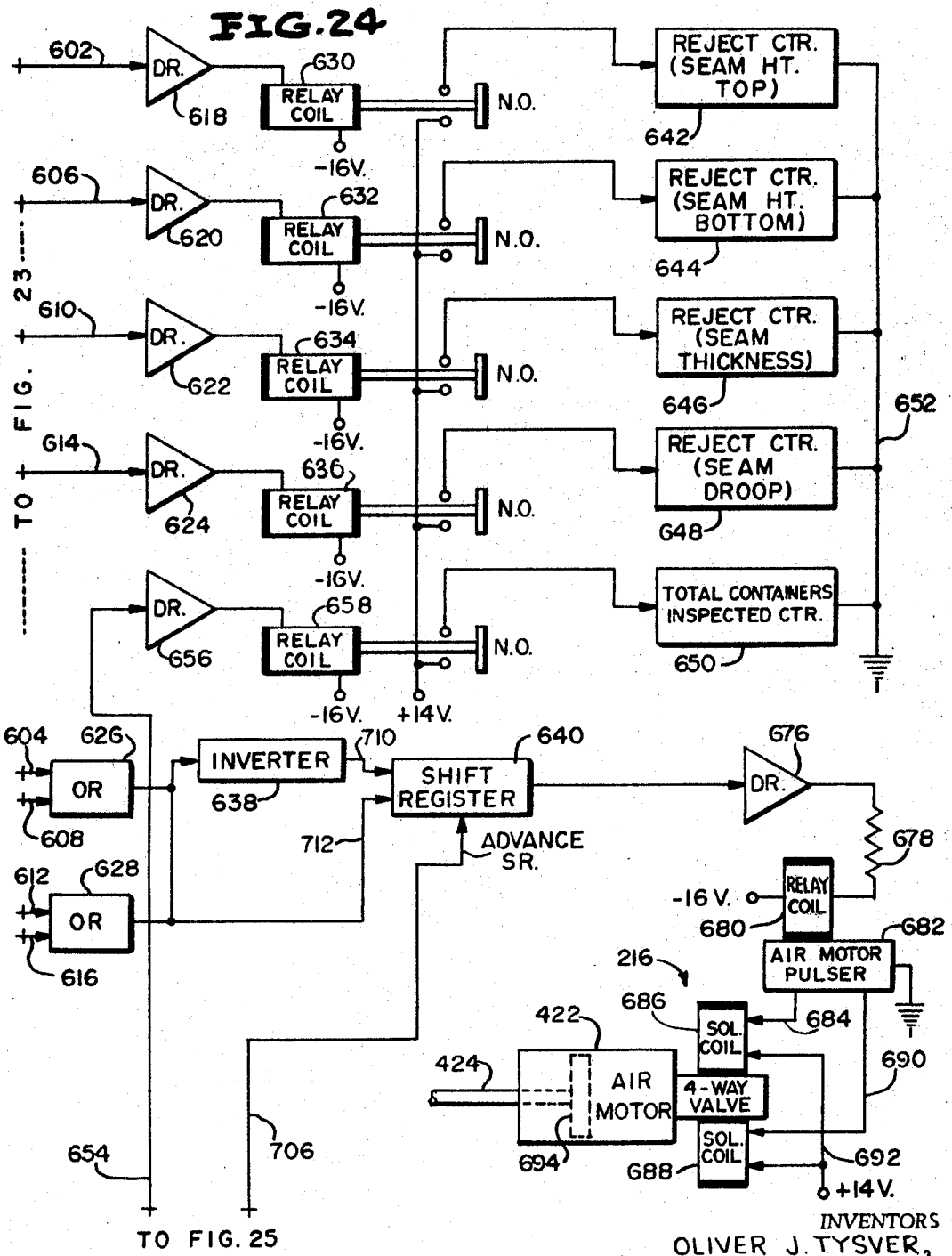

Aug. 19, 1969    O. J. TYSVER ET AL    3,462,015
CONTOUR CHECKING DEVICE
Filed Sept. 28, 1965    13 Sheets-Sheet 13

*Fig. 25*

INVENTORS
OLIVER J. TYSVER,
HENRY J. KEINANEN
& ERNEST M. GORE

BY
Mason, Porter, Diller & Brown
ATTORNEYS

United States Patent Office 3,462,015
Patented Aug. 19, 1969

3,462,015
CONTOUR CHECKING DEVICE
Oliver J. Tysver, Park Forest, Henry J. Keinanen, Hickory Hills, and Ernest M. Gore, Chicago, Ill., assignors to Continental Can Company, Inc., New York, N.Y., a corporation of New York
Filed Sept. 28, 1965, Ser. No. 490,806
Int. Cl. B07c 5/34; G01m 3/00; G05b 3/14
U.S. Cl. 209—80
56 Claims

ABSTRACT OF THE DISCLOSURE

Disclosed herein are a method and a device for mechanically positioning a container having an end joined thereto by a double seam for electronically inspecting the profile of the contour formed by the double seam. At an inspection station, a lower chuck engages the container and resiliently urges it into engagement with an upper chuck and a seam roller. While the container is being rotated at the inspection station, the position of the shadow of the seam on a shadow graph is detected at a number of points by a plurality of optical sensors. Electronic logic circuitry receives the inputs from the sensor and determines the acceptability of the container.

---

This invention relates to a contour checking device and more specifically to a device for determining if the contour of an article adheres to a predetermined standard. The device is most useful for determining the performance of seaming and forming rollers by the inspection of the product formed by the rollers.

In the production of high volume items, such as containers, a number of separate operations, usually mechanical in nature, are performed in the fabrication of the item.

Since good business practices dictate that quality control procedures be established and performed during the fabrication of the item, samples of the item are selected after each step and examined to determine if the sample conforms to the quality standard. In many such operations, only a visual inspection is necessary to determine the conformity of the item to the predetermined standard. In other situations, the visual inspection will not suffice and other procedures must be employed to determine the quality of the item.

A well known method of determining the performance of the fabricating equipment is to randomly select the items for inspection and subsequently subjecting the items to destructive testing. In this manner, the seams of containers formed of rigid or semi-rigid materials may be inspected. However, destructive testing is inefficient and not always satisfactory. For example, by the very nature of the inspection procedure, the item is destroyed and no longer suitable for use. Another and perhaps still greater disadvantage, is that in the process of mechanically inspecting the item, the item is bent, distorted or changed so that an accurate picture of the item as it existed prior to inspection, is not available for later visual observation. For example, it is a common practice in the inspection of side seams and end seams of containers to sever the seam either transversely or along the seam and then determine if the seam conforms to the predetermined standards. In this manner, the severing device, whether it be a saw, knife, etc. may alter the seam during the severing procedure so that the determination of acceptability must be made after the usefulness of the item has been destroyed rather than the condition of the item as it existed prior to testing.

The seaming and forming rollers employed in the fabrication of metal containers are subject to wear and must be periodically replaced. Usually, the rollers are inspected as well as the containers formed by the rollers. As the rollers change dimension, the contours of the container also change and at some point the distortion of the contour of certain areas of the container becomes so great that the container is no longer acceptable as a high quality item. Therefore, the rollers must be replaced or rebuilt.

In the formation of metallic containers, a body blank is joined so that a tubular shape is formed. Thereafter, a container end is affixed at one end of the tubular member. Lastly, the container is filled with a vendable product and the other or second body end is affixed, thus completely closing the container. In the container end attaching operation, a chuck and seaming roller usually cooperate in forming a seam of the container end over the projecting peripheral edge of the tubular container body. Sufficient force is applied in the forming of the seam so that the seam will not rupture under ordinary pressures to which the container may be subjected. Heretofore, containers were selected at random and inspected by a hand micrometer to determine if the seam so formed adhered to the standard. Another type of device commonly used in inspecting fabricated items is the go-no-go gauge which is simple in construction and operation and yet may be employed to determine if the item being inspected conforms to the standard.

In the production of items which may total a million or more per day, it becomes absolutely essential that rapid, economical and accurate quality control procedures be established since good business practice dictates that the hand testing procedures of the past must be abandoned. Accordingly, it is in this light that the present invention has been conceived which eliminates many of the limitations inherent in previous inspection procedures. The present invention is rapid, accurate, dependable and is readily adaptable for integration with existing container fabrication lines.

Accordingly, it is the principal object of the present invention to improve contour configuration checking devices.

It is a further object of the present invention to determine if the contour of a selected area conforms to a predetermined standard.

It is a further object of the present invention to eliminate the waste and loss of time associated with known containers seam checkers by an accurate and rapid checking system employing electronic, optical and mechanical principles.

It is a further object of the present invention to determine the seam roller wear in a container fabrication line by inspecting the contour of the container produced by the seam rollers.

It is a further object of the present invention to provide a system for serially advancing containers through an inspection station and determining the acceptability of the container.

It is a further object of the present invention to provide a system for serially advancing containers along a predetermined path, elevating the container to an inspection station, and determining the acceptability of the container based upon the inspection.

It is a further object of the present invention to provide a system for serially advancing containers through an inspection station, determining the acceptability of the container, and, on the basis of the determination, accepting or rejecting the container.

It is a further object of the present invention to provide a means for examining a number of discrete areas in the profile of a container seam to form a determination of the acceptability of the container.

It is a further object of the present invention to provide a means for sampling a number of preselected areas in the profile of a container seam to condition a logic circuit having predetermined criteria wired therein relating to the acceptability of the container.

It is a still further object of the present invention to provide an electron circuit capable of making a logical decision relating to the acceptability of a container based upon information derived from contour sampling transducers.

These and other objects of the present invention are accomplished by intercepting selected ones of the containers being fabricated by container fabrication equipment after at least one of the container ends has been secured to the container body and directing the selected containers to an inspection station. The selected containers are serially advanced to an indexing turret. At one of the indexed positions, an inspection station is provided. At the inspection station, a stationary upper chuck and a movable lower chuck are positioned. As the lower chuck is raised, the edge or double seam of the container engages the upper chuck and a seam roll positioned adjacent the upper chuck. The seam roll is resiliently biased toward the upper chuck and as the bottom chuck continues to raise the container, tapered surfaces on the upper chuck and the seam roll guide the edge or double seam of the container into position. An optical system is positioned adjacent the container which is restrained between the upper and lower chucks. As the chucks rotate the container, the shadow of the upper seam of the container under inspection and a portion of the seam roller are projected onto an optical plate which magnifies the inspection area.

With the image of the inspection area, the profile of the double seam joining the container end to the container body, being projected upon the optical plate of the optical comparator, a plurality of light sensitive devices are selectively positioned for gauging the shadow image or profile. The apparatus is designed to measure the various dimensions of the double seam with respect to two fixed reference planes. The reference planes are the countersink radius for all height and depth measurements and the chuck taper for all thickness dimensions. Since the inside diameter of the double seam varies and is always larger than the seaming chuck on which it is located, it is necessary to use the seam roll, previously discussed, to force the seam against the upper chuck. This insures locating the area to be inspected on a fixed reference plane. The seam roll is relieved in the area of the seam thickness to allow light through the seam thickness detectors. The countersink radius is located on the chuck by the base plate pressure.

The dimensions measured are the maximum and minimum countersink depth, maximum and minimum seam height at the top, maximum and minimum seam height at the bottom, maximum and minimum seam thickness, and maximum droop. Accordingly, the light sensitive detectors are selectively positioned upon the shadow profile of the area to be inspected so as to gauge the enlarged image of the double seam profile for maximum and minimum tolerances at the desired points. The image of the double seam is obtained by projecting the profile of the double seam, enlarged by 62.5× onto the ground glass screen of a commercially available shadow-graph. The gauging of the image at the desired points is achieved by detecting the presence of light or by detecting the absence of light with photomultiplier tubes. The light is conducted to the photomultiplier tubes by flexible glass fibers. By positioning a detector in the light area, a maximum defect will be detected when the shadow of the double seam covers the detector. Conversely, a detector in the shadow area will cause a reject when exposed to light.

After the apparatus is calibrated with containers of known maximum and minimum dimensions, the unknown containers are inspected and the output from the photo- multiplier tubes is interpreted by electronic logic to determine the acceptability of the container. The electronic circuit is capable of making a logical decision relating to the acceptability of a container based upon the information derived from the contour sampling transducers positioined in the shadow-graph. After the logical circuitry makes a decision relating to the acceptability of the container, the information is stored in a shift register so as to preserve the decision until the mechanical apparatus must accept or reject the container.

Recording means are provided in the circuitry for counting the total number of containers inspected, the number of containers rejected due to the seam height (top) failing to adhere to the standard, the number of containers rejected due to the seam height (bottom) failing to meet the standard, the number of containers rejected due to the seam thickness failing to fall between the preselected limits, and the number of containers rejected due to too great a seam droop.

A number of timing devices are employed for controlling the electronic circuitry. A first device is utilized to check the operativeness of the optical system prior to the inspection cycle. Other timers are used to control the length of the inspection cycle. In addition, a timer is employed to reset the logic at the end of the inspection cycle. Also, the inspection cycle is inhibited during the interval at which the container body side seam would be visible by the optical elements. This inhibit feature is necessary since the double seam of the container end invariably departs from its usual configuration when the container body side seam is encountered.

The invention both as to its organization and method of operation together with further objects and advantages thereof will best be understood by reference to the following specification taken in conjunction with the accompanying drawings in which:

FIGURE 2 is a schematic showing of the container inspection showing and emphasizing the mechanical lifting means for the containers and the optical path of the optical projection system;

FIGURE 3 is a plan view of the ground glass screen of the optical comparator and illustrating the positions of the detection points;

FIGURE 4 is a view showing the maner in which the shadow image of the double seam and the seam roller appear on the face of the ground glass screen of the FIGURE 3;

FIGURE 5 is a plan view of the mechanical apparatus and illustrating the entry path of the containers selected for inspection and the two exit paths, one for containers within tolerance and the other for containers out of tolerance;

FIGURE 12 is a sectional view taken along the line 12—12 of the FIGURE 7 and depicting the cooperation of the upper chuck and the spring-biased seam roller with a container at the inspection station;

FIGURE 13 is a sectional view taken along the line 13—13 of the FIGURE 7 and looking in a direction opposite to that of the FIGURE 12 and emphasizing the position of the two photocell units which control the inspection cycle;

FIGURE 14 is a sectional view taken along the line 14—14 of the FIGURE 12 and illustrating the positions of the lower chuck and the upper chuck prior to the elevation of the container by the lower chuck;

FIGURE 15 is a sectional view similar to the FIGURE 14 but illustrating the lower chuck in its elevated position wherein the container end now engages the upper chuck;

FIGURE 16 is a sectional view taken along the line 16—16 of the FIGURE 15 and emphasizing the cooperation between the upper chuck and the seam roller for engaging the double seam of a container so as to form the inspection station;

FIGURE 17 is a sectional view showing the knockout pad being actuated to remove the container from its inspection position;

FIGURE 18 is a plan view of a portion of the apparatus in the area of the reject gate and showing the position of the reject gate when the container is accepted as being within tolerance;

FIGURE 19 is a view similar to the FIGURE 18 but showing the position of the reject gate when the container is rejected, i.e., out of tolerance;

FIGURE 20 is an elevational view of the reject gate of the FIGURES 18 and 19 and illustrating its position between the upper and lower plates of the indexing turret;

FIGURE 21 is a schematic showing of the manner in which the FIGURES 22, 23, 24 and 25 are assembled to illustrate the electronic logic embodiment of the invention;

FIGURE 22 is a block diagram of a portion of the electronic logic and emphasizing the photomultiplier transducer which receives the light signals from selected areas of the ground glass plate of the optical comparator via glass fibers;

FIGURE 23 is a portion of the electronic logic which receive the outputs from the FIGURE 22 and forms a binary representation of the acceptability-non-acceptability of the container under inspection;

FIGURE 24 is a portion of the electronic logic and emphasizing the counters for recording the out of tolerance containers as well as other memory means for recording the position of the containers on the indexing turret; and FIGURE 25 is a portion of the electronic logic and showing or illustrating the inspection photocells, a pair of controlling bistable devices, and the four timing means.

MECHANICAL DESCRIPTION

The mechanical description and certain electromechanical features of the invention are set forth in the FIGURES 1 through 20.

Figure 1:
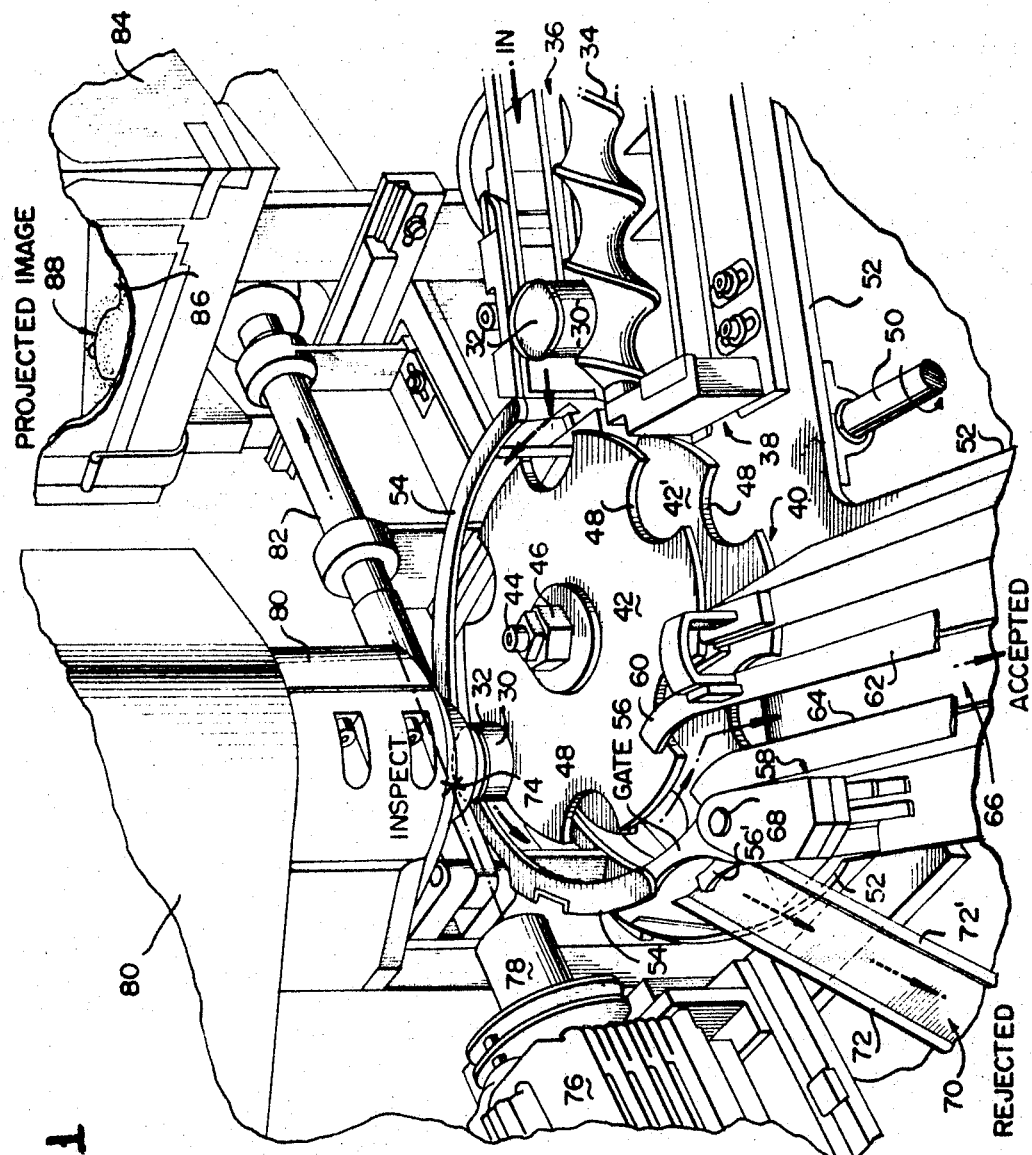
FIGURE 1 is a perspective view and illustrating the containers being delivered to the indexing turret for elevation to the inspection station.

With reference to the FIGURE 1, the manner in which the containers are delivered to an indexing turret, inspected, and rejected or accepted is emphasized. More specifically, a container 30 having a container end 32 roller thereon is shown in a first position being advanced by an auger 34 in a delivery chanel 36 and in a second position at the inspection station. The delivery auger 34 is supported in the delivery channel 35 by any suitable means such as the bearing-bracket arrangement indicated at 38.

The containers 30 are delivered to a delivery turret 40 having an upper plate 42 and a lower plate 42' which are supported in spatial relationship by a vertical shaft 44 having a nut 46 thereon. It will be observed that the upper plate 42 and the lower plate 42' of the turret 40 have a plurality of equally spaced peripheral notches 48 for receiving and advancing the containers 30.

Surrounding the delivery turret 40 is an arcuate guide 54 which is supported from a base plate 52 and serves to retain the containers 30 in the notches 48 of the delivery turret 40. The arcuate guide 54 is discontinuous after traversing approximately one-half of the circumference of the delivery turret 40 and ends with a gate 56 forming a short portion of the container 30 retaining means. The gate 56 is mounted for bistable movement upon a support 58. The gate 56 has a first position as shown in the FIGURE 1 where the containers are advanced to an accepted channel which indicates that the inspected container was within the allowable tolerance. The containers 30 are guided into the accepted channel by a guide 60 which extends slightly over the upper plate 42 of the delivery turret 40 and joins a straight section 62 which serves to guide the accepted containers 30 to an accepted receiving hopper (not shown). A second straight section 64 is substantially parallel to the section 62 and forms the other side of an accepted or within tolerance channel 66.

The gate 56 of the FIGURE 1 is supported by the support 58 and rotatable about a vertical shaft 68. When suitable means, to be hereinafter described, are applied to cause the gate 56 to rotate clockwise about the shaft 68, the gate 56 will then extend into the container 30 path so as to cause the containers 30 to be directed to a rejected channel 70. The rejected channel 70 is formed of a pair of guides 72 and 72' and receives the containers 30 that were determined at the inspection station to be out of tolerance.

The inspection station is indicated at 74 and is at the junction of the light rays from a lamp 76 and a condensing lens 78 with the double seam of the container end panel. The inspection station 74 involves a number of moving elements which are suitably housed within a housing 80 and which will be described in detail with reference to later figures. The image formed by the light rays from the condensing lens 78 at the inspection station 74 are transmitted through a projection lens 82 to an optical comparator 84. The optical comparator is a type of commercially available shadow-graph and the projected image of the double seam formed by the container end 32 on the container 30 is projected, after magnification onto a ground glass screen 86. The projected image is indicated at 88 on the ground glass screen 86 and it will be readily acknowledged by those skilled in the art that the symbolic showing at 88 is for the purposes of clarity and that the image would actually be projected in the area of a number of devices for determining the light flux at preselected points, all of which will be described subsequently in greater detail.

In the FIGURE 2, the inspection station 74 is shown in greater detail, although symbolically, which includes a lower chuck 90 having a circular stop 92 which mates with and engages the lower flange of the container 30. Directly above the container 30 is an upper chuck 94 having a supporting housing 80 which permits continuous rotation of the upper chuck 94. The lower surface of the upper chuck 94 is formed so as to mate with and engage a peripheral rim or double seam 98 formed when the container end 32 is rolled on the container body. A seam roller 100 is positioned adjacent the upper chuck 94 and since the seam roller 100 is biased (not shown in the FIGURE 2) toward the upper chuck 94, the double seam 98 is urged into the sampling or inspection area 74 formed at the point of engagement of the seam roller 100 with the double seam 98 of the container 30.

As shown in the FIGURE 2, the lower chuck 90 is adapted for vertical movement, as well as rotational movement which will hereinafter be described, by its connection to a connecting rod 102 which is connected to a follower arm 104 having a cam follower 106 connected to one end thereof. The follower arm 104 pivots about a shaft 108. A cam 110 having a grooved cam surface 112 engages and controls the cam follower 106. It will be readily understood that the FIGURE 2 is a type of perspective view and symbolically shows the cams in their operating positions. The cam 110 is affixed to a shaft 114, which shaft 114 receives its rotary motion from a chain drive 116 driven by a suitable source of motive power such as indicated at 140.

A second cam 118 having a cam surface 120 is affixed to the shaft 114 and the cam surface 120 controls a cam follower 122 positioned therein. The cam follower 122 is coupled to a follower arm 124 which has an end affixed to the shaft 108. At the opposite end of the follower arm 124, is a connection for coupling a connecting rod 126 to an upper link 128. The upper link 128 is pivoted by a shaft at 130 and operates a rod 132 whose lower end within the upper chuck 94 is connected to a knock-out pad (not shown in the FIGURE 2) for disengaging the containers 30 from the upper chuck 94 and the seam roller 100 after inspection. The upper chuck 94 is provided rotary motion through a cogged belt 134 driving a pulley 136, the motion being supplied to the belt 134 by a pulley 138. The pulley 138 is mounted upon a shaft to which suitable motion may be applied from the source 140.

The light source 76 of the FIGURE 2 directs its energy through a condensing lens 78 along a light path 142 which is focused upon the inspection station 74. The shadow formed by the double seam 98 and a portion of the seam roller 100 is projected through the projection lens 82 and to the ground glass screen 86 of the optical comparator 84 after reflection by the reflecting surfaces 144 and 146. At the ground glass screen 86, the optical output is taken to the electronic logic for determining whether the dimensions of the double seam 98 of the container 30 fall within the prescribed limits.

The seam roller 100 is continuously driven along with the upper chuck 94 and has a lower tapered portion 148 directed toward a small groove 150, the groove 150 being in alignment with the double seam 98. The purpose of the groove 150 is to permit an optical detector to be positioned for sensing the maximum seam thickness. This feature is illustrated in greater detail in the FIGURE 3.

With reference to the FIGURE 3, the ground glass screen 86 of the comparator 84 receives an image 98' of the double seam 98 as well as the image 100' from that portion of the seam roller 100 that is in engagement with the double seam 98. As previously noted, the seam roller 100 has a small groove 150 formed therein. The FIGURE 4 illustrates the physical engagement of the double seam 98 with the seam roller 100 and it is the image or shadow of this engagement which is projected onto the ground glass screen 86 of the FIGURE 3.

The principle of the operation is to gauge the enlarged image of the double seam profile 98' for maximum and minimum tolerances at desired points. The desired points are set forth in the FIGURE 3. After the image 98' of the double seam 98 is obtained on the ground glass screen 86 (magnified 62.5× in the preferred embodiment) the gauging of the image 98' at the desired point is achieved by detecting the presence of light or the absence of light at the selected points with photomultiplier tubes. The light is conducted to the photomultiplier tubes by flexible glass fibers known as light pipes. By positioning a detector (a light pipe) in the light area, a maximum defect will be detected when the shadow of the double seam 98 covers the detector. The output of the photomultiplier tube is stored in a memory system and the defective container is then rejected at the reject station. Conversely, a detector in a shadow area will cause a reject when exposed to light. The detectors are mounted on dovetail slides 152, 154, and 156 as shown in the FIGURE 3. A pair of detector holders 158 and 160 are retained by the slide 152. The detector holders 158 and 160 are adjustable by a pair of fine threaded adjustment screws 162 and 164, respectively. The minimum dimension for the seam height (top) is afforded by an adjustment of a detector 168 affixed to the detector holder 158. It will be noted that the detector 168 is positioned within the shadow area 98' and the optical output of the detector 168 is conducted to the electronic circuitry by a light pipe 170. Similarly, the maximum seam height (top) is determined by a detector 172 positioned in the light area. The optical condition of the detector 172 is transmitted to the electronic circuitry by a light pipe 174.

The seam thickness tolerances will now be discussed. The minimum seam thickness is determined by a detector 176 mounted upon a detector holder 178 within the dovetail slide 154 and adjustable by a screw 180. The optical condition of the detector 176 is transmitted to the circuitry via a light pipe 182. Similarly, the maximum seam thickness is determined by positioning a detector 184 in the lighted groove area 150. The detector 184 is supported by a detector holder 186 in the dovetail slide 154. The position of the detector 184 may be varied by an adjustment screw 188 connected to the detector holder 186. As the position of the detectors 168 and 172 determine the minimum and maximum seam height (top), the positions of the detectors 176 and 184 determine the minimum and maximum seam thickness. That is to say, if the image 98' of the double seam 98 falls between the detectors 176 and 184, the thickness tolerance is acceptable. A light pipe 185 is coupled from detector 184.

The dovetail slide 156 of the FIGURE 3 supports three holders 190, 192 and 194. At the end of the angled holder 190, is positioned a detector 196 which sets the limit for the minimum seam height (bottom). The position of the detector 196 may be varied by an adjustment screw 198 coupled to the holder 190. The maximum seam height (bottom) is determined by a detector 200 normally positioned in the light area and upon a slide 192 which is adjusted by an adjustable screw 202 coupled thereto. The maximum droop that occurs at the intersection of the double seam and container body side seam is sensed by a detector 204 positioned in the light area and directly below and slightly to the right of the detector 200. The position of the detector 204 may be varied by an adjustment screw 206 connected to the holder 94. The optical output of the detectors 196, 200 and 204 are transmitted to the electronic circuitry via the light pipes 208, 210 and 212, respectively.

The method employed to determine the position of the detector 168, 172, 176, 184, 196, 200 and 204 is set forth. A set of test containers incorporating the variables listed, except for the seam height maximum and minimum, is first obtained by setting the seamer of a container fabrication line to produce these variables. These test containers are then used, along with a set of measuring strips for seam height, to position the detectors. By the combination of measurements determined from the detectors of the FIGURE 3, the condition of the seaming rollers of the fabrication equipment is determined by employing the detectors to yield an indication of the maximum and minimum countersink depth, the maximum and minimum seam thickness, the maximum and minimum seam height, and the maximum droop of the double seam. In addition, these measurements will also detect three other gross defects which are a broken chuck, a dead head, and a cutover, any of which will produce containers of unacceptable tolerances or conditions.

With reference to the FIGURE 5, a plan view of the mechanical portion of the invention is illustrated and showing the manner in which the containers 30 are advanced along the delivery channel 36 on a constantly driven belt 37 in cooperation with the delivery auger 34 which is suitably journaled and driven as indicated by the gears 214. The containers are advanced by the belt 37 and delivery auger 34 which is continuously rotated in synchronism so as to insert the containers 30 into the notches 48 of the delivery turret 40. The upper plate 42 of the delivery turret 40 is visible in the FIGURE 5 and rotates about the vertical shaft 44. At the inspection station indicated at 74, a plurality of timing devices, to be hereinafter described, permit the electronic circuitry to interrogate the detectors of the FIGURE 3 and thereby determine if the container under inspection is within tolerance. The light path 142 generated by the lamp 76 through the condensing lens 78 is continuously present and may at times be reflected through the projection lens 82 and to the optical comparator 84; however, the aforementioned timers only permit the circuitry to interrogate the detectors during the sampling or detecting cycle.

If the container is found to be acceptable, this information is stored in a register whose output controls a gate actuator 216 which is coupled to pivot the gate 56 about its shaft 68. If the container is found to be acceptable, the gate 56 remains in the position shown in the FIGURE 5 and the container continues being advanced by the delivery turret until it is urged out of its notch 48 by the guide 60. Thereafter, the container continues along the accepted channel formed by the sections 62 and 64 to be discharged as an accepted or within tolerance container. If the container which has been inspected at the inspection station 74 has been determined to be out of tolerance, then at the appropriate time the memory means, storing the signal for actuating the gate actuator 216, would actuate the gate actuator 216 so that the gate 56 would project into the path of the containers and thereby urge the rejected container out of its respective notch 48 and into the rejected channel 70 formed by the guides 72 and 72'. Thereafter, inspection of the counters of the electronic circuitry would reveal the reasons for the rejected container such as improper seam height at the top, improper seam thickness, improper seam height at the bottom, or too much droop.

As shown in the FIGURE 5, the shaft 50 is constantly rotated by a conventional motor-gear reducing and right angle drive arrangement indicated at 218. The shaft 50 has a pulley 51 mounted thereon about which the belt 37 is entrained in driven relationship. Also, the pulley 138 is supplied suitable rotary motion for driving the pulley 136 through the cogged belt 134. The rotation of the pulley 136 will rotate the upper chuck at the inspection station 74, the upper chuck 94 not being visible in the FIGURE 5. A number of the timing operations are controlled by a shaft 114 which rotates a cam 118 and pivots a cam follower 122 so as to operate a knock-out pad within the upper chuck 94 for dislodging the container from the upper chuck 94 and the seam roller 100 after inspection. More specifically, the cam follower 122 will operate the connecting rod 126 which is affixed to a sleeve 222 of the link member 128. The sleeve 222 is suitably journaled upon the shaft 130. The sleeve 222 has a projecting arm 224 extending therefrom and a yoke 226 is in engagement with a coupling 228. The coupling 228 engages the rod 132 which forms the knock-out rod coupled to a knock-out pad, to be hereinafter described, positioned within the upper chuck 94.

A cam 110 is also secured to the shaft 114 and through the cooperation of the cam follower 106, will actuate the lower chuck 90, not visible in the FIGURE 5, at the appropriate time. The shaft 114 may be turned by hand for checking the machine by engaging the hand wheel and gearing arrangement indicated at 230.

The shaft 114 also controls a set of timers, to be hereinafter described, which are mounted in the area indicated at 232. The timers referred to perform optical checking procedures, regulate the inspection cycle and reset certain electronic elements at the expiration of the inspection cycle.

Figure 6:
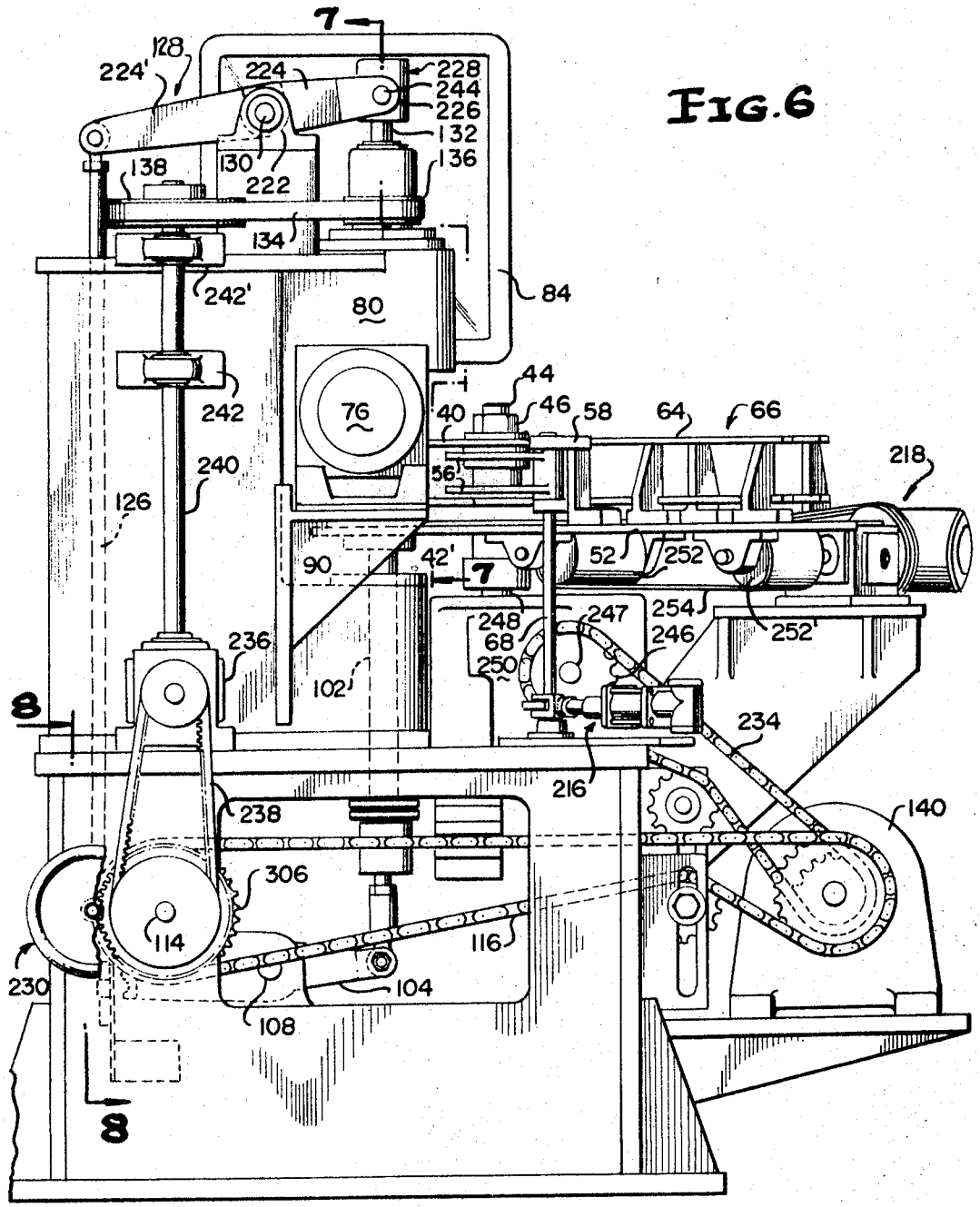
FIGURE 6 is a side elevational view of the invention taken along the line 6—6 of the FIGURE 5 and emphasizing the indexing turret and elevating means for the containers at the inspection station.

In the elevational view of the FIGURE 6, the source of rotational energy, such as the motor 140, drives the chain 116 as well as a chain 234. The chain 116 produces rotary motion at the shaft 114 which then drives a right angle gear box 236 through a cogged belt 238. The gear box 236 translates the motion by 90 degrees and applies rotational energy to a vertical shaft 240. The vertical shaft 240 is suitably journaled at 242 and 242' and rotates the pulley 138. Rotation of the pulley 138 drives the pulley 136 through the belt 134 and thereby rotates the upper chuck 94 as set forth with reference to the FIGURE 2.

In the FIGURE 6, the knock-out pad operating mechanism is illustrated by another view and it will be recalled that the knock-out pad is a shaft and small pad concentric with the upper chuck 94 which is actuated to control the raising and lowering of the container and at the conclusion of the inspection cycle to dislodge the container 30, under inspection, from the upper chuck 94 and the seam roller 100. The seam roller 100, being spring-biased toward the upper chuck 94, permits the entry and removal of containers 30 between the surfaces of the upper chuck 94 and seam roller 100 constituting the inspection station 74. As the shaft 114 rotates the connecting rod 126 reciprocates as a result of the cam follower 122 affixed to its lower end cooperating with the cam 118 and in synchronism so as to be lifted upwardly at the appropriate time so as to dislodge the inspected container. The upward movement of the connecting rod 126 will rock the arm 224' clockwise about its sleeve 222, the sleeve 222 being adapted for limited rotation upon the shaft 130. The actuation of the sleeve 222 will rock the arm 224 downwardly (clockwise) and thus, through the cooperation of the yoke 226, which is secured to the coupling 228 by a pair of horizontal trunnions 244, will drive the rod 132 downwardly. As will be illustrated in subsequent figures, the rod 132 is connected to the knock-out pad so as to accomplish the function of removing the inspected container from the inspection station 74.

The motor 140 of the FIGURE 6 also drives the chain 234 and a sprocket 246, driven by the chain 234, is employed to drive the input shaft 247 of an indexing unit 250.

The upper plate 42 and the lower plate 42' of the delivery turret 40 are driven through a shaft 248 which is the output shaft of the indexing unit 250. The indexing unit 250 is a commercially available item and will not be discussed in detail with reference to the present invention. Suffice it to say, the indexing unit 250 rotates the shaft 248 and the turret 40 in a series of repetitive stop-and-go motions so that the containers to be inspected are retained at the inspection station 74 a sufficient period of time to complete the inspection cycle. In a preferred embodiment which was constructed and operated in accordance with the principles of the present invention, the indexing unit 250 delivered 50 containers per minute to the inspection station 74. It will be understood that this figure of 50 containers per minute is illustrative and a lesser or greater number per minute are anticipated. Since the containers 30 are securely retained during the inspection cycle, the containers 30 are not free to topple or otherwise move from the inspection station. With this in mind, the inspection features performed by the present invention could be speeded up to a number much in excess of the 50 containers per minute.

The input shaft 247 of the indexing unit 250 passes completely through the unit and its other end (not shown), is employed to drive the timing auger 34 (FIGURE 5) through the gears 214 in timed relationship with the delivery turret 40 in a conventional manner.

In the FIGURE 6, the accepted container channel 66 is shown and is formed by a pair of pulleys 252 and 252' having smooth surfaces and being suitably journaled to the underside of the base plate 52. A belt 254 having a smooth outer surface is entrained about the smooth pulleys 252 and 252' and the upper surface of the belt 254 moves in a direction away from the delivery turret 40 so that any containers delivered thereto are quickly and conveniently removed from the delivery turret area.

The pulley 252' is constantly driven by a shaft of the drive unit 218 as best shown in FIGURE 5.

Figure 7:
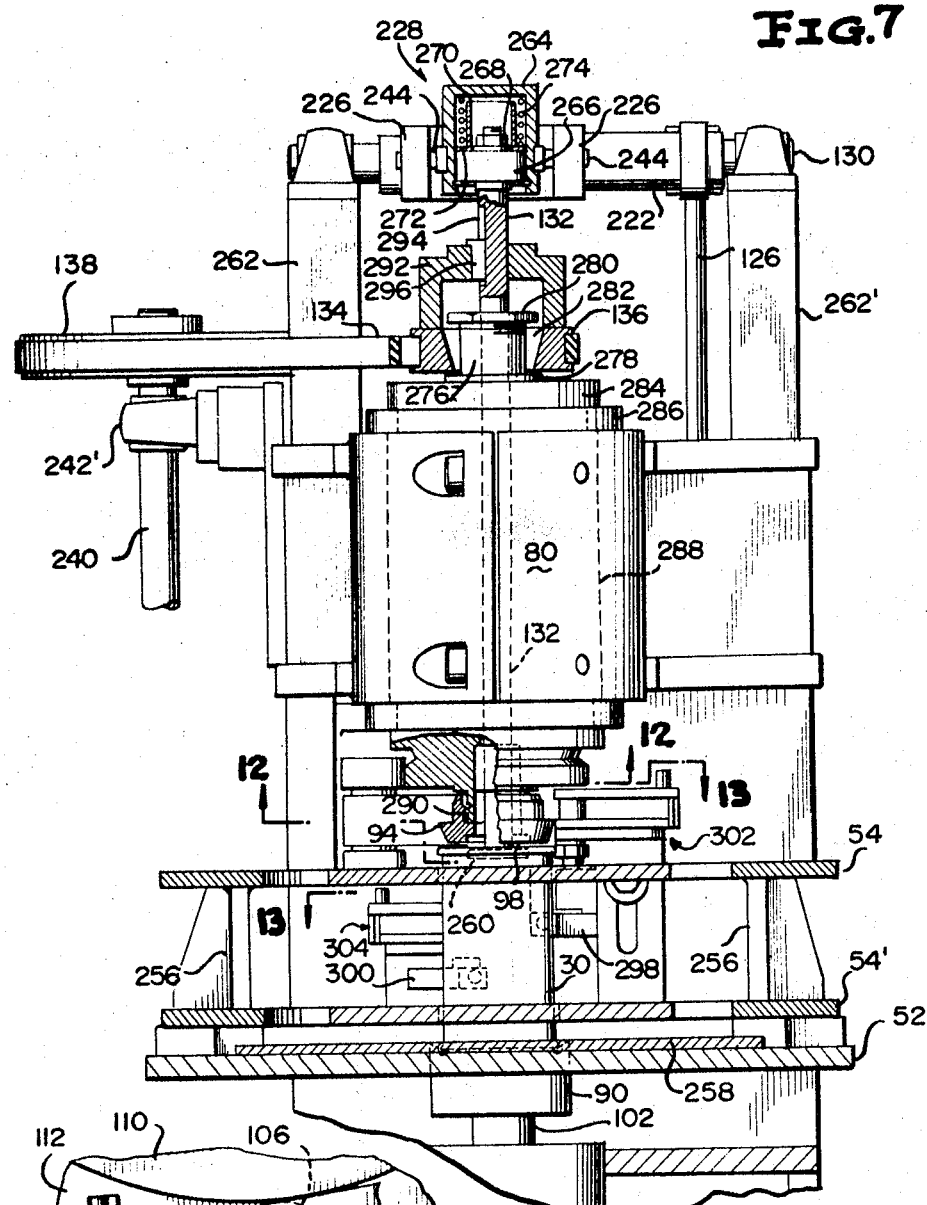
FIGURE 7 is a sectional view taken along the line 7—7 of the FIGURE 6 and illustrating the details of the container inspection station including the upper and lower chucks.

The FIGURE 7 is a sectional view taken along the line 7—7 of the FIGURE 6 which emphasizes the operation of the knock-out pad in performing its function of holding a container firmly against the lower chuck 90 during lifting and lowering and removing inspected containers 30 from the inspection station 74. A container 30 is shown in position immediately before inspection and is supported between the knock-out pad 260 and the lower chuck 90 which will be subsequently elevated so as to place the double seam or rim 98 of the container 30 in the inspection area. A portion of the arcuate guide 54 is shown in the FIGURE 7 and is joined to a lower substantially similar section of arcuate guide 54' by vertical connecting members 256. A stationary circular support plate 258 is supported above the base plate 52 and as the containers 30 slide along the support plate 258, they are retained in their respective notches of the delivery turret 40 and also by the guide composed of the arcuate sections 54 and 54'.

The FIGURE 7, being partly in cross-section, clearly illustrates the means for guiding and removing the containers from the inspection station which includes the vertical rod 132 to which is attached a pad 260 at its lower end. In its non-operating position, the pad 260 is retracted and seats within the upper chuck 94. When actuated, the pad 260 extends beyond the lower surface of the chuck 294 so as to dislodge the container 30 under inspection from the inspection station and follow it down holding it steady on the lower chuck 90 until the lower chuck is fully retracted.

The horizontal shaft 130 of the FIGURE 7 is suitably positioned by a pair of supports 262 and 262' which are affixed to the base of the apparatus. The sleeve 222 surrounds the shaft 130 for a portion of its length and the yoke 226 extends from the arm 224 which is secured to the sleeve 222. The coupling 228 includes a housing 264 having a pair of short trunnions 244 extending therefrom which are journaled in apertures formed in the yoke 226. The shaft 132 extends into the housing and is retained therein by a bearing 266 secured thereto. A nut 268 is threaded upon the upper end of the shaft 132 and retains the shaft 132 in position. A retainer 270 having a circular flange 272 is positioned over the bearing 266 and within the housing 264. A coil spring 274 surrounds the retainer 270 and is in engagement with the top of the housing 264 as well as the circular flange 272 so as to resiliently urge the bearing 266 along with the shaft 132 downwardly. Thus, as the yoke 226 is driven downwardly, the spring 274 may slightly compress as the pad 260 engages a container 30 so as to eliminate the possibility of damage to the container 30.

Rotation of the shaft 240 as shown in the FIGURE 7, will rotate the pulley 138 and drive the belt 134 about the pulley 236. A rotating sleeve 276 having an annular portion 278 receives the shaft 132. Although the sleeve 276 rotates along with the shaft 132, a bushing (not shown) within the sleeve 276 will permit longitudinal movement of the shaft 132. A circular wedge 282 surrounds the sleeve 276 and lockingly engages the inner tapered diameter of the pulley 136 when the retaining nut 280 is tightened. In this manner the pulley 136, wedge 282 and the sleeve 276 rotate together. The annular portion 278 of the sleeve 276 is secured to a plate 284 of a spindle 288 so as to cause the spindle to rotate therewith. Positioned between the housing 80 and the plate 284 is a stationary plate 286 whose flat surface near its edge is supported by the housing 80 and whose upper surface is in sliding engagement with the plate 284. The spindle 288 is threaded at its lower end, indicated at 290 so as to receive the upper chuck 94. In this manner, different upper chucks 94 having various configurations may be employed, the configuration being dependent upon the containers to be inspected.

A cup-shaped housing 292 surrounds the retaining nut 280 and is secured to the pulley 136 in any suitable manner, such as by bolts (not shown). A keyway 294 is formed in the shaft 132 and a key 296 is slidably positioned in the keyway 294 and is fixed in a similar keyway formed in the cup-shaped housing 292. In this manner, the shaft 132 is rotated by the key 296 at the same speed as the spindle 288 with the key permitting longitudinal movement of the shaft 132 as necessary to dislodge the containers from the inspection station after inspection.

In the area adjacent the container 30 under inspection shown in the FIGURE 7, are a pair of photoheads 298 and 300 which are employed to define the timing cycle. Each of the photoheads 298 and 300 are self-contained units in that they include an illumination source as well as a photoelectric pickup. The photoheads 298 and 300 will block the electrical circuitry during the time that the side seam of the container is being viewed by the optical system. This is necessary in that it is usual for the double seam 98 to be slightly bulged at the junction with the side seam of the container body. The photohead 298 is adjustably supported by the means 302 while the photohead 300 is positioned for adjustment byt he means 304. In this manner, the photoheads 298 and 300 may be conveniently adjusted depending upon the parameters of the container under inspection.

Figure 11:
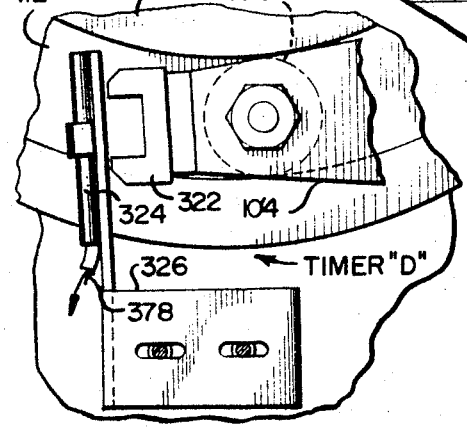
FIGURE 11 is a sectional view taken along the line 11—11 of the FIGURE 8 and showing the manner in which a timing signal is derived.
Figure 8:
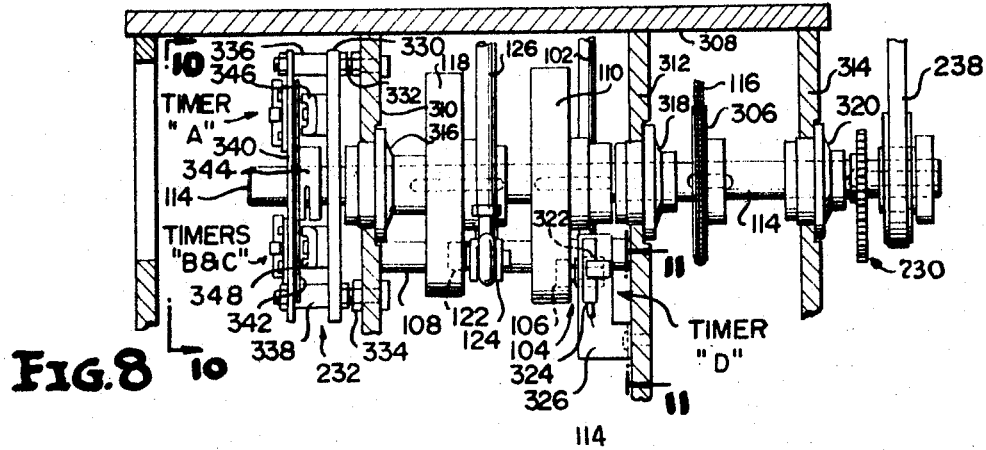
FIGURE 8 is a sectional view taken along the line 8—8 of the FIGURE 6 and illustrates the apparatus for removing the containers from the upper chuck and seam roller after inspection and also the assembly for deriving certain timing signals.

In the FIGURE 8, a longitudinal view of the chuck cams and the four timers is illustrated. The drive means 140, illustrated in the FIGURE 6, rotates a sprocket 306 by means of the chain 116. In this manner, the shaft 114 is driven. The shaft 114 is supported from a base member 308 by the downwardly projecting rigid members 310, 312 and 314 in spatial relation. Each of the members 310, 312 and 314 has a bearing 316, 318 and 320, respectively, positioned therein so as to permit rotary motion of the shaft 114. The cam 110 is spaced by any convenient means from the member 312 and operates the cam follower 106, as shown. A magnet 322 of a timer D is secured to the follower arm 104 and reciprocates therewith as best shown in FIGURE 11. The motion of the magnet 322 induces magnetic flux into a pickup 324 creating a signal to operate the timer D which resets an enable flip-flop in the electronic logic. The timer D is enabled from approximately 136° of the cam shaft to 314° as shown at 328 in the FIGURE 9. The magnet 322 is secured to the end of the follower arm 104 which is controlled by the cam follower 106 in the cam surface 112 of the cam 110. Oscillatory motion of the magnet 322 will be sensed by the pickup 324 and indicated on its electrical leads 378 which would continue on to the electronic logic. The bracket 326 maintains the pickup 324, the pickup 324 being a flux responsive device, in a rigid position, as shown.

The cam 118 shown in the FIGURE 8 is suitably positioned from the bearing 316 on the shaft 114 and controls a cam follower 122, as shown. The cam follower 122 operates the follower arm 124 which reciprocates the connecting rod 126 driving, through a plurality of connections, the knock-out pad 260 which dislodges the container under inspection from the inspection station.

Toward the left end of the shaft 114 as viewed in the FIGURE 8, a plate 330 is positioned in spatial relationship to the rigid member 310 by the connections indicated at 332 and 334. A plurality of spacers, two of which are indicated at 336 and 338, position a timer mounting plate 340 which supports the timers A, B, and C which control certain operations in the electronic logic. A ferrous timing disk 342 is secured to the shaft 114 by a collar 344 which causes the ferrous timing disk 342 to rotate with respect to the timers A, B, and C. A plurality of timer elements in the form of magnets, two of which are shown at 346 and 348, are mounted on the plate 330 and generate magnetic fields which are interrupted by the ferrous timing disk 342 so as to produce a changing signal which is picked up by the timers A, B, and C. The timers will be discussed with reference to the FIGURE 10.

Figure 10:
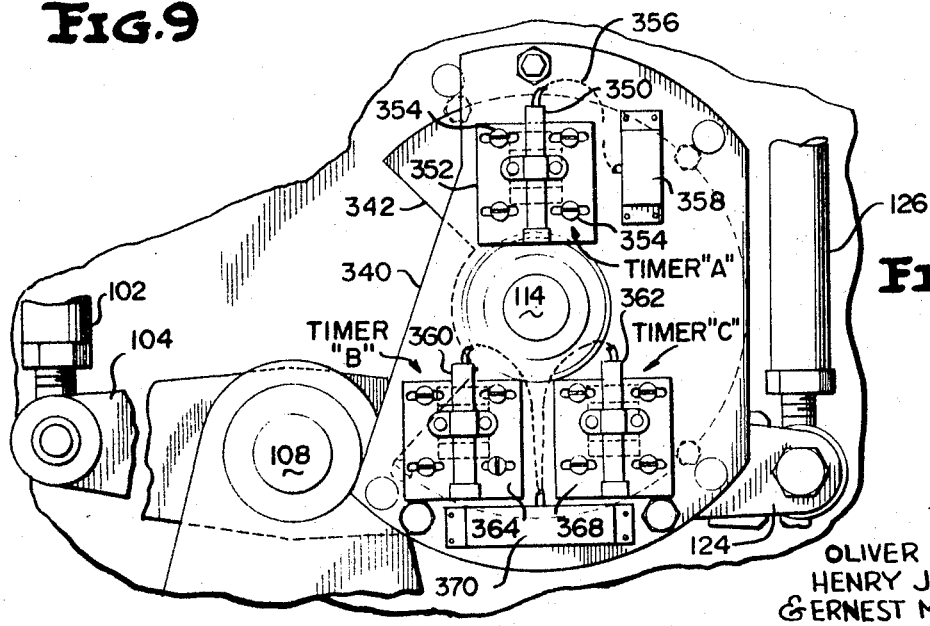
FIGURE 10 is an end view taken along the line 10—10 of the FIGURE 8 and emphasizing the position of the apparatus for deriving certain of the timing signals.

The FIGURE 10, a view taken along the line 10—10 of the FIGURE 8, clearly illustrates the timer pickups. The timer A includes a device 350 which is responsive to the change in magnetic flux due to the rotation of the ferrous timing disk 342 and is mounted for adjustment upon the timer mounting plate 340 by a bracket 352 supported by a plurality of bolts 354. The output from the transducer device 350 is coupled by electrical leads 356 to a terminal board 358. From the terminal board 358, conductors (not shown) are directed to the electronic logic. Similarly, the timers B and C include the flux responsive devices 360 and 362, respectively, which are secured to a pair of adjustable mounting plates 364 and 368. The electrical output from the flux responsive devices 360 and 362 are directed to the conductors, as shown, to a terminal board 370 from which they are directed to the electronic logic.

Figure 9:
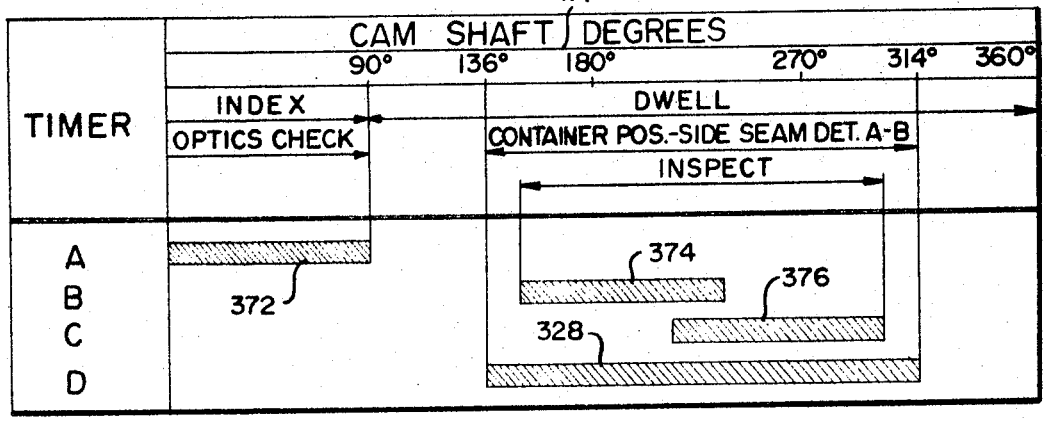
FIGURE 9 is a graphic illustration of the activation of the timing signals as related to the rotation of the cam shaft of the FIGURE 8.

With reference to the graph of the FIGURE 9, the timer A is set to be operative from 0 to approximately 90° rotation of the cam shaft 114 as indicated at 372. The timer A performs an optics check during this portion of the cycle which determines the availability of the light source for performing the inspection cycle. The timers B and C are overlapped and determine the inspect cycle as indicated at 374 and 376. The overlapped setting of the timers B and C permits a change in the leading and trailing edges of the inspection cycle as well as permitting an adjustment as to the length of the inspection cycle. As indicated in the FIGURE 9, the inspection cycle is from approximately 150° to 300° rotation of the cam shaft 114.

The FIGURE 12 is a sectional view taken along the line 12—12 of the FIGURE 7 and is looking upward from the inspection station. The container 30 is joined by a side seam 380 and a container end 32 is affixed to the container 30 which forms a double seam or ridge 98, as shown. It is the ridge 98 which is inspected at the inspection station. The upper chuck 94 is tapered as indicated at 382 and the seam roller 100 is tapered as indicated at 148. In this manner, when the container 30 is elevated into the inspection station, the seam roller 100 will pivot about a shaft 384 and compress a spring 386 to permit the double seam 98 of the container 30 to "snap" into position. The seam roller 100 rotates about a stud 388 mounted upon an arm 390. The arm 390 is pivoted on a bracket 392 by the shaft 384. The bracket 392 is secured to a mounting plate 394 by a bolt 396. In addition, the mounting plate 394 is bolted to a plate 397 which in turn is bolted to the frame as indicated at 398 and 398'. The spring 386 is retained in the mounting plate 394 in a depression 400. The other end of the spring 386 is retained in the arm 390 by a bolt 402.

While the upper chuck 94 is positively driven, the seam roller 100 is initially driven through its engagement with the upper chuck 94 and when a container is in place it is driven by the double seam 98. The resilient bias of the seam roller 100 against the upper chuck 94 or against a double seam 98 assures continuous rotation of the seam roller 100 at all times while the upper chuck 94 is driven.

The FIGURE 13 is a sectional view taken along the line 13—13 of the FIGURE 7 and illustrates the photoheads in position to illuminate and receive the reflection from a portion of the container 30. The photohead 298 is positioned for adjustment by the adjusting means 302 while the photohead 300 is positioned for adjustment by the adjusting means 304. A hand knob 404 on the adjusting means 302 permits easy directional adjustment of the photohead 298 and a hand knob 406 on the adjusting means 304 permits simple directional adjustment of the photohead 300. Height adjustment of the photoheads 298 and 300 is also permitted in a similar obvious manner not specifically referred to but as illustrated in FIGURE 7. The photoheads 298 and 300 are self-contained units which house a light source, a photoelectric pickup, and the necessary mirrors and lenses for projecting and receiving the reflection from the light source.

The container 30 of the FIGURE 13 is advanced upon the support plate 258 by the plates 42 (and 42') of the indexing turret 40 and the turret 40 will index a distance equal to the separation between successive notches 48 of the plates 42 (and 42') of the turret 40. A flat support member 408 supports the photohead 298 and its adjusting means 302 while a support member 410 supports the photohead 300 and its adjusting means 304. A small conduit 412 supplies a stream of air to the inspection station so that the double seam 98 of the container 30 under inspection is free of extraneous particles during the inspection cycle.

The FIGURES 14, 15, 16 and 17 will be jointly discussed. The FIGURE 14 illustrates a container 30 being held in position on the lower chuck 90 by the knock-out pad 260 and about to be elevated to the inspection position. The FIGURE 15 shows the position of the container 30 at the moment that the upper chuck is engaged. The seam roller, in the FIGURE 15, is behind the upper chuck 94 and by rotating the FIGURE 15 by 90°, the positions of the upper chuck 94, double seam 98 of the container 30, and the seam roller 100 are now clearly visible in the FIGURE 16. The FIGURE 17 illustrates the actuation of the knock-out pad 260 for dislodging and following the container 30 down from the inspection station 74.

More specifically, in the FIGURE 14 the container 30' is shown in phantom outline just prior to reaching the position shown in cross-section and the lowering of the knock-out pad. The position of the container 30' shown in phantom outline is slightly higher than that shown in cross-section since the cross-sectional showing now illustrates the container 30 positioned within the circular stop 92 which is formed in the upper surface of the lower chuck 90. The stop 92 serves initially to position the container 30 and as shown in the FIGURE 15, provides the additional function of limiting the increase in circumference of the lower flanged portion of the container 30. It will be noted that as the container 30 positioned between the knock-out pad and lower chuck is elevated by the lower chuck 90, a rather heavy force resisting the elevation manifests itself as soon as the container end 32 engages the upper chuck 94. Accordingly, the lower flange of the container 30 will temporarily elastically spread slightly and engage the circular stop 92.

It will be noted that the upper chuck 94 is in threaded engagement with the spindle 288 so that chucks of different configuration may be readily positioned upon the spindle 288, the chuck being selected that mates with the contour of the container end 32, as shown in the FIGURE 15. The threaded engagement of the chuck 94 with the spindle 288 is illustrated at 290.

Although the figures illustrate the inspection of containers having an open end, it will readily be evident to those skilled in the art that containers having both ends closed may also be inspected, the inspection being accomplished as readily as the inspection procedure set forth. In the event that a lower container end is affixed to the container 30, then the double seam of the lower container end would nest within the circular stop 92 although any spreading of the flange of the container 30 would be inhibited since the spreading of the flange would be restrained by the lower container end.

In the FIGURE 16, which is taken along the line 16—16 of the FIGURE 15, the double seam 98 of the container 30 and container end 32 is shown at the inspection station 74. The optical image or shadow of the engagement of the double seam 98 with the upper chuck 94 and the seam roller 100 is the area under inspection, as the elements are rotated, and the projected image is shown in the FIGURE 3. With reference again to the FIGURE 16, the upper chuck 94 and the double seam 98 are shown being separated at 414 with the amount of separation indicated at 414 being greatly exaggerated for illustration purposes. This separation does not affect the inspection cycle since it is the portion of the double seam 98 between the upper chuck 94 and the seam roller 100 that is currently being inspected. As the portion of the double seam 98 adjacent the separation 414 rotates approximately 180°, it will assume the position shown at the inspection station 74. The separation 414 is due to a slight downward force which results in the separation occurring at a point approximately 180° removed from the section of the double seam 98 currently being engaged by the upper chuck 94 and the seam roller 100.

During the elevation of the container 30 toward the inspection station 74, the double seam 98 is guided into the inspection station 74 by the tapered surface 148 of the seam roller 100 and the tapered surface 382 of the upper chuck 94. Thus, exact alignment of the double seam 98 is not required since the tapered surfaces of the upper chuck 94 and the seam roller 100 will cooperate to guide the double seam 98 into the inspection station 74. The seam roller 100 has the small groove 150, as previously set forth, surrounding the seam roller 100 so as to permit a small quantity of light to extend therethrough and thus permit the positioning of a photo detector within the light area permitted by the groove 150. In addition, a shoulder 416 is positioned immediately below the groove 150 and at the upper terminus of the tapered portion 148. At the inspection station 74, it will be noted that the double seam 98 abuts a portion indicated at 418 and rides along the shoulder 416.

In the FIGURE 17, the removal of the container 30 from the inspection station 74 has been accomplished by actuation of the shaft 132 which causes the knock-out pad 160 to abut the container end 32. The force provided by the knock-out pad 260 causes the resiliently biased seam roller 100 to move from the position shown in phantom outline at 100' to the position shown in solid outline at 100. From here on, the container 30 will continue its downward movement with the knock-out pad 260 continuing to exert pressure on the end 32 so as to keep the can seated on the lower chuck 90 until the lower chuck is fully retracted after which the knock-out pad retracts upwardly within the upper chuck 94. The seam roller 100, being constantly urged leftwardly as viewed in the FIGURE 17, will now move leftwardly and await the arrival of another container to be inspected. Meanwhile, the upper chuck 94 along with the shaft 132, knock-out pad 260, and spindle 288 continue to rotate. The upper chuck 94 or the double seam 98 provides rotational energy to the seam roller 100.

With reference to the FIGURES 18, 19 and 20, the means for directing the containers either to the accepted channel 66 or the rejected channel 70 will be discussed. The FIGURE 18 illustrates the position of the gate 56 when the container is to be accepted while the FIGURE 19 illustrates the position of the gate 56 when the container is to be rejected since it does not fall within tolerance. The gate actuator 216 may be in the form of an air motor having a cylinder 422 housing a piston, not shown. A piston rod 424 protrudes from the cylinder 422. The gate actuator 216 includes a first and a second solenoid coil which position a solenoid-operated four-way compressed air valve of the free spool type. Actuation of the first solenoid will position the piston within the cylinder 422 in a first position, which is a stable position and energization of the second solenoid will position the piston within the cylinder 422 in its other stable position. The normal position of the reject-accept mechanism is that shown in the FIGURE 19. That is, when no container is present or a reject container is present in the notch 48 approaching the gate 56, the gate 56 will be in the position shown in the FIGURE 19. When an acceptable container is present, the gate 56 will be in the position shown in the FIGURE 18. The gate 56 is not returned to its reject position after each container; however, the gate 56 will remain in its last position as long as successive containers receive the same reject-accept classification as the previous container.

The first and second solenoid coil along with the air valve control thereby is best shown in the FIGURE 20 at 426. The piston rod 424 is coupled to a bifurcated link 428. The bifurcated link 428 receives a second link 430 which has a single projection at one of its ends which is received by the link 428 and is bifurcated at its other end. A pin 432 joins the bifurcated link 428 and the link 430 while a pin 434 joins the bifucated portion of the link 430 to a link 436 which is rigidly connected to the shaft 68. With reference to the FIGURE 18, as the piston rod 424 is driven leftwardly, the link 430 will rock the link 436 clockwise and thus cause the gate 56 to assume the position shown in the FIGURE 19. The link 430, being pinned at both of its ends by the pins 432 and 434, will take up any misalignment between the piston rod 424 and the link 436.

As shown in the FIGURE 20, the lower end of the shaft 68 is suitably journaled by a bearing 438 upon a base member 440. The gate actuator 216 is supported upon the base member 440 by the brackets 442, as shown. The support 58 is the support for the gate elements 56 and 56' and includes an angle bracket 444 secured to the base member 52 by any suitable means such as the bolts 446. A lower sleeve 448 is secured to the bracket 444 by a projection 450 and an upper sleeve and bracket 452 is secured to the upper surface of the bracket 444, the aperture in the sleeve and bracket 452 being in alignment with the aperture in the sleeve 448 so as to accept and permit rotation of the shaft 68. A spacer 454 is located on the shaft 68 and between the sleeve 448 and the sleeve and bracket 452. The gate elements 56 and 56' project and are attached to the spacer 454 and substantially normal to the shaft 68. The gate or gate elements 56 and 56' are shown in the FIGURE 20 between the upper plate 42 and the lower plate 42' of the delivery turret 40. It will be readily understood by those skilled in the art that the gates 56 and 56' could be above and below, respectively, of the plates 42 and 42' and that the gate actuator 216 could take any other convenient form.

ELECTRONIC DESCRIPTION

The electrical features and electronic logic of the invention are illustrated in the FIGURES 21, 22, 23, 24 and 25. The FIGURE 21 illustrates how the FIGURES 22, 23, 24 and 25 may be placed in a side-by-side relationship to yield a readily understandable block diagram. The function of the electronic logic of the FIGURES 22 through 25 is to receive the optical outputs from the detectors of the optical comparator and to convert the optical output into electronic currents which may be logically interpreted as relating to the tolerance of the double seam 98 of the containers 30 under inspection.

More specifically, a high voltage source 456 supplies a suitable high voltage to the photomultiplier tubes #1, #2, #3, #4, #5, #6, and #7 by a pair of conductors 458 and 460. Between the conductor 460 and each of the photomultiplier tubes #1 through #7 is a potentiometer 462, 464, 466, 468, 470, 472 and 474, respectively. The purpose of the potentiometers 462, 464, 466, 468, 470, 472 and 474 is to permit variation of the voltage applied to the photomultiplier tubes #1 through #7 so as to vary the sensitivity of the tubes.

As shown on the FIGURE 22, a light pipe 174 (see FIGURE 3) delivers the output of the seam height top detector 172 (maximum tolerance) to the photomultiplier tube #1. The detector 172 is so positioned on the ground glass plate 86 of the optical comparator 84 that if light is available tto the detector 172, then the top seam height is within tolerance. Similarly, a light pipe 170 from the seam height top detector 168 (minimum tolerance) delivers an optical signal to the photomultiplier tube #2. The detector 168 is so positioned upon the ground glass screen 86 of the optical comparator 84 that to be within the minimum tolerance, the detector 168 would be sensing no light.

The output from the seam height bottom detector 200 (maximum tolerance) is applied to the light pipe 210 which is coupled to the photomultiplier tube #3. The tector 200 is so positioned that if the maximum seam height at the bottom has not been exceeded, then the detector 200 is illuminated and light is admitted to the photomultiplier tube #3. The light pipe 208 is coupled to the seam height bottom detector 196 (minimum tolerance) and transmits the optical condition of the detector 196 to the photomultiplier tube #4. If the container under inspection is within the minimum tolerance as regards the seam height at the bottom then the detector 196 would not be illuminated.

A light pipe 185 is coupled to the seam thickness detector 184 (maximum tolerance) and delivers its output to photomultiplier tube #5. If the seam thickness is within the maximum tolerance, the detector 184 would be illuminated with light, as shown. The seam thickness detector 176 provides its output to the light pipe 182 and to the photomultiplier tube #6. If the seam thickness is within the minimum tolerance, then the detector 186 would be dark and not illuminated.

The seam droop detector is a single detector and provides an indication as to whether the seam extends down to the area of the ground glass screen 86 wherein the detector 204 is positioned. The output of the detector 204 is directed via the light pipe 212 to the photomultiplier tube #7. If the seam droop is within tolerance, the detector 204 would be lighted and this light would be supplied to the photomultiplier tube #7.

The output from the photomultiplier tube #1 is coupled through a resistor 476 to an emitter-follower 478. A meter 480 may be coupled to the terminals 482 and 482' for determining the voltage and/or current flowing through the resistor 476. The meter 480 may be employed during testing and setting-up procedures.

The output from the photomultiplier tube #2 is coupled through a resistor 484 to an emitter-follower 486. In the event that one wishes to determine the voltage across the resistor 484, the meter 480 would be applied to the terminals as shown across the resistor 484.

The output from the photomultiplier tube #3 is coupled through a resistor 488 and to an emitter-follower 490 while the output from the photomultiplier tube #4 is coupled through a resistor 492 to an emitter-follower 494. A pair of terminals project from the end of each of the resistors 484 and 492 in the event that meter readings are to be taken by the meter 480.

With continued reference to the FIGURE 22, the seam thickness tolerance is determined by the photomultiplier tubes #5 and #6 whose outputs are coupled, respectively, through a resistor 496 to an emitter-follower 498 and a resistor 500 to an emitter-follower 502. The seam droop photomultiplier tube #7 is conected through a resistor 504 to an emitter follower 506. Each of the resistors 496, 500 and 504 have a pair of projecting terminals for receiving the meter 480 through instrumentation procedures.

The outputs from each of the emitter-follower 478 through 506 of the FIGURE 22 on the conductors 508 through 520 are coupled, respectively, as inputs to a group of Schmitt triggers 522 through 534. The output from the Schmitt trigger 522 is connected to an OR circuit 536. The output from the Schmitt trigger 524 is connected through an inverter 538 whose output is then connected to an OR circuit 536. The output of the Schmitt trigger 526 is connected to the input of an OR circuit 540 while the output of the Schmitt trigger 528 is coupled through an inverter circuit 542 and then as an input to the OR circuit 540. The output of the Schmitt trigger 530 is directed to an inverter 543 as well as to an OR circuit 544. Finally, the output of the Schmitt trigger 532 is connected to an input to an inverter circuit 546 whose output is directed to the OR circuit 544.

Under certain conditions, the detectors 168, 172, 196, 200, 176, 184 and 204 may not be completely dark or completely light. If some means were not provided to determine the acceptability of the signal when the detector was one-fourth, one-half or three-quarters, for example, illuminated then electronic frustration may manifest itself. However, this partial illumination of the detectors is overcome by the Schmitt triggers 522 through 534 whcih may be set by means, not shown, to trigger at a predetermined level. In order that the output from the Schmitt triggers 522 through 534 may be determined, a meter 548 has an input lead 550 adjacent a switch from each of the Schmitt triggers. These switches are switch 552 from the Schmitt trigger 522, a switch 554 from the Schmitt trigger 524, a switch 556 from the Schmitt trigger 526, a switch 558 from the Schmitt trigger 528, a switch 560 from the Schmitt trigger 530, a switch 562 from the Schmitt trigger 532, and a switch 564 from the Schmitt trigger 534. During instrumentation and testing procedures, the detector under test may be partially illuminated, say one-half illuminated, and with the switch manually depressed to actuate the meter 548, the threshold or firing point of the Schmitt trigger may be observed and/or adjusted.

The outputs from the OR circuits 536, 540 and 544 of the FIGURE 23 are applied as inputs, respectively, to the AND circuits 566, 568 and 570. An enable signal on a conductor 572 is applied to each of the AND circuits 566, 568 and 570 and is generated from the $\overline{F}$ side of a flip-flop 574 of the FIGURE 25. The outputs from each of the AND circuits 566, 568 and 570 are directed to the set side of the flip-flops 576, 578 and 580, respectively. The flip-flops 576, 578 and 580 are reset by a signal on a reset conductor 582 which originates from the normally closed contacts of a relay 584 of the FIGURE 25. When the normally closed contacts of the relay 584 are in the closed position as shown, the —12 volts applied to a terminal 586 through a resistor 588 is at ground. However, when the normally closed contact is open, the —12 volts at the terminal 586 is then applied to reset the flip-flop 576, 578, 580 as well as a flip-flop 590 coupled to the output of the Schmitt trigger 534 of the FIGURE 23 and also a flip-flop 592 of the FIGURE 25.

An optics check is performed before each inspection cycle to determine the availability of the light sources. In the event that a light source fails, then the optics check would reveal such failure. The optics check is performed by taking the output from each of the inverters 538, 543 and 546 on the conductors 594, 596 and 598, respectively, of the FIGURE 23 to an AND circuit 600 of the FIGURE 25. The timer "A" samples the output of the AND circuit 600 just prior to the inspection cycle. In the event that all inputs are not available to the AND circuit 600 at this time, the system will be shut down.

With reference to the FIGURE 23, the condition of the flip-flops 576, 578, 580 and 590 are indicative of whether the container under inspection will be accepted or rejected. If rejected, the appropriate counter will be actuated so as to retain a count of the number of containers rejected for being out of tolerance and the reason for rejecting the containers. For example, the $\overline{F}$ conductors 602, 606, 610 and 614 from each of the flip-flops 576, 578, 580 and 590, respectively, are coupled to the driver circuits 618, 620, 622 and 624, respectively, of the FIGURE 24. The driver circuits 618, 620, 622 and 624 provide sufficient current for activating their associated relay coils 630, 632, 634 and 636. The F side of each of the flip-flops 576, 578, 580 and 590 are coupled via the conductors 604, 608, 612, and 616 to the OR circuits 626 and 628, as shown on the FIGURE 24. The output of the OR circuits 626 and 628 are coupled to an inverter 638 as well as to a shift register 640. The output of the inverter 638 is also coupled as an input to the shift register 640. If a container has been interrogated and found acceptable, the flip-flops 576, 578, 580 and 590 will provide outputs on their conductors 604, 608, 612 and 616 that will not affect the shift register 640; however, in the event that the container is to be rejected, then the shift register 640 will be actuated so as to store a represenation of the position of the rejected container in the delivery turret 40. As the rejected container in the delivery turret 40 approaches the gate 56, the gate will be positioned so as to reject the container in the rejection channel 70.

With reference to the FIGURE 24, the normally open contacts of the relay 630, when closed, will apply a voltage of 14 volts, which is illustrative in magnitude, to a reject counter 642 which records that a container has been rejected due to improper tolerance of the seam height at the top area. Similarly, actuation to the relay 632 will close the normally open contacts associated with that relay so as to inject a count into a reject counter 644, indicating that a container has been rejected due to improper seam height at the bottom. When the normally open contacts of the relay 634 are closed, the voltage will be applied to a reject counter 646 to actuate that counter and indicate that the double seam of the container under inspection did not meet the tolerance as to seam thickness. Finally, when the normally open contacts of the relay 636 are closed, the positive voltage will be applied to a reject counter 648 indicating that the seam droop of the inspected container was too great and that the detector associated with the droop sensor did not receive light indicating acceptance. Each of the counter 642, 644, 646 and 648 as well as a total containers inspected counter 650 are connected to ground via the conductor 652, as shown.

It is desirable in such an inspection operation, to determine the number of total containers that have been inspected. This function is performed by the total containers inspected counter 650 of the FIGURE 24 which receives its output, through other circuitry, from the flip-flop 592 of the FIGURE 25. The flip-flop 592 is enabled once each time a container is inspected. The $\bar{F}$ output from the flip-flop 592 on a conductor 654 is coupled to a driver circuit 656 of the FIGURE 24. The output from the driver circuit 656 is coupled to actuate a relay coil 658 and when so actuated, the normally open contacts of the relay 658 will close and inject a count into the total containers inspected counter 650 since the positive voltage of 14 volts is now applied to the counter 650.

With reference to the FIGURE 25, a container 30 is shown being rotated and the side of the container is being illustrated and the reflected light being generated and received by a pair of photoheads A, and B. The photoheads A and B are self-contained units providing a light source, a light pickup and the necessary mirrors and lenses within the unitary structures. A DC power supply 660 provides via the conductors 662 and 664 a source of current, in parallel, for the photoheads A and B. The output from the photohead A is directed to an amplifier 666 whose output is then directed to a Schmitt trigger 668. Similarly, the output from the photohead B is conducted to an amplifier 670 and then to a Schmitt trigger 672. The function of the photohead A is to define the end of the inspection cycle while the function of the photohead B is to define the start of the inspection cycle. The photoheads will not permit inspection of the double seam 98 of the container 30 when the side seam 380 is in the viewing area since the double seam 98 normally bulges slightly at this junction and would produce an erroneous reading for an otherwise acceptable container. The output from each of the Schmitt trigger 668 and 672 is directed to the flip-flop 574. The $\bar{F}$ output of the flip-flop 574 provides an enable or interrogate signal on the conductor 522 to the AND circuits 566, 568 and 570 of the FIGURE 23. The F output of the flip-flop 574 is not used and the flip-flop is reset by timer D which actuates a reset circuit 674, as shown. The restoration of flip-flop 574 must occur before the start of the inspection cycle. This is necessary so that there is time enough to start the gating of side seam interval (by photohead A), should the inspection cycle start at the moment when the side seam is in the inspection area because the side seams 380 of the containers 30 would be randomly distributed when elevated to the inspection station. That is to say, the side seam of successive containers would not necessarily all be in the same position at the time that the containers are elevated for inspection.

With reference to the FIGURE 24, the output of the shaft register 640 is applied to a driver circuit 676 whose output, is coupled through a resistor 678 to a relay coil 680 which controls an air motor pulser 682. The outputs of the air motor pulser 682 are directed via a conductor 684 to a solenoid coil 686 and also to a solenoid coil 688 via a conductor 690. A positive voltage is applied via a conductor 692 to both the solenoid coil 686 and 688. The solenoid coils 686 and 688 control an air motor having the cylinder 422 which houses a piston 694 connected to the piston rod 424. The operation of the relay coils, solenoids, etc. associated with the control of the air motor will be discussed with reference to the operation of the system.

As shown in the FIGURE 25, the timer A with a normally open switch is positioned between the output of the AND circuit 600 and a driver circuit 696. The output of the driver circuit 696 is coupled through a resistor 698 to a holding relay coil 700. The contact of the holding relay 700 is normally closed so that when a manually closeable switch 702 is depressed, the line voltage upon the terminals 704 is supplied to the system operating motors indicated at M. Once each cycle, the timer A will close its contacts and sample the output of the AND circuit 600. If the illumination system is operating properly, no voltage is supplied to the driving circuit 696 and the holding relay coil 700 will not be actuated. In the event that the illumination system for the inspection system should fail, when the timer A causes its associated switch to be closed, the AND circuit 600 will produce an output which will energize the holding relay coil 700 and thereby open the contacts and turn off the system since a complete circuit no longer exists through the drive means indicated at M.

The timer B and the timer C of the FIGURE 25 control a relay 584 having a pair of normally closed contacts as well as a pair of normally open contacts. The contacts of the timers B and C are both normally open. When the timers B and C are in the position shown, the relay 584 is deenergized and the normally closed contacts are closed and the flip-flops 576, 578, 580 and 590 will accept information. During this interval, the enable signal from the flip-flop 574 of the FIGURE 25 will condition the AND circuits 566, 568 and 570 of the FIGURE 23 so that if the other inputs to the respective AND's are present, then the respective flip-flop will indicate a container out of tolerance.

At the end of the inspection cycle, (reference may be had to the FIGURE 3 as well as to the FIGURE 35) the timers B and C would close their contacts so as to actuate the relay 584 which would then open its normally closed contacts and close its normally open contacts. In this position, the −12 volts applied at the terminal 586 is available to reset the flip-flops 576, 578, 580 and 590 and, in addition, through the functioning of a resistor 698, a capacitor 700, and in parallel, a resistor 702 and a diode 704, a pulse of very short duration will be applied to a conductor 706 to advance the shift register 640 of the FIGURE 24. In addition, a signal is generated on a conductor 708 to strobe an AND circuit 710 whose other input from the Schmitt trigger 668, will produce one output per container to the flip-flop 592. The one output from the flip-flop 592 on the conductor 654 will actuate the total containers inspected counter 650 of the FIGURE 24.

OPERATION OF THE SYSTEM

The contour checking device of the present system will be described with reference to the inspection of the double seam of a metal container. The double seam is the seam formed at the junction of a container end with a container body. It will be readily understood by those skilled in the art, that any contour or configuration can be inspected by the present invention and the only requirement is that the contour to be inspected be brought in some manner to the inspection station. As is usual in the inspection of containers, delivery turrets, chucks, belts, etc. are the usual means for transporting containers; however, in the transportation of objects having other shapes that are to be inspected, the mechanism for transporting the objects to the inspection station will be readily evident. Therefore, it will be understood that the description of the invention with reference to the inspection of the double seam of a container is merely illustrative and that the invention possesses great applicability in the inspection of other contours and objects.

After it has been determined that the system is operative (the motors, clutches, power supplies, illumination sources, etc. are in a go condition), it is necessary to position the detectors 168, 172, 176, 184, 196, 200 and 204 as shown in the FIGURE 3. It will be understood that the position of these detectors are determinative of the acceptance or non-acceptance of the object under inspection.

The procedure for locating the detectors on the ground glass screen 86, illustrated in the FIGURES 1 and 3, is to obtain a set of test containers incorporating the variables to be gauged except for the seam height maximum and minimum. These may be obtained by controlling the seamer of a conventional container line to produce a set of test containers having the maximum and minimum tolerances which have been determined to be acceptable. These test containers are then used along with a set of measuring strips for seam height, to set the detectors. The detector employed and the variable dimension detected is as follows:

| Variable dimension: | Detector used |
|---|---|
| Countersink depth, max. | Seam height top max. (detector 172). |
| Countersink depth, min. | Seam height top min. (detector 168). |
| Seam thickness, max. | Seam thick max. (detector 184). |
| Seam thickness, min. | Seam thick min. (detector 176). |
| Seam height, min. | Seam bottom min. (detector 196). This setting is measured on the screen and is the min. seam height dim. measured from the seam height top max. detector. |
| Seam height, max. | Seam height bottom max. (detector 200). This setting is measured on the screen and is the max. height dim. measured from the seam height top min. detector. |
| Droop, max. | (Detector 204). This setting is to be made with a can selected from a production run which is considered to have the max. allowable droop, as determined without seam tear down. |

A container of minimum seam thickness would be employed to set the seam thickness minimum detector 176 only. A container with maximum countersink depth would be used to set the seam height top maximum (detector 172) only. That is to say, the container selected for a specific limit would be employed to set only the detector sensing that limit. The test container is indexed into the inspection station 74 and its image is projected on the ground glass screen 86 of the optical comparator 84. The detectors are then adjusted in the order listed above.

The exact position at which a limit is exceeded is determined by inserting the voltage meter 548 of the FIGURE 23 at the Schmitt trigger test points. Actuation of one of the switch arms 552 through 564 to engage the conductor 550 would provide a visual indication of the voltage output and at what point in time the respective Schmitt trigger actually triggers or fires.

The first detector to be set is the seam height top maximum detector 172. This would be a container having maximum countersink depth. First, the switch arm 552 of the FIGURE 23 is caused to engage the conductor 550 so that the meter 548 is now operative. Next, adjust the detector 172 away from the shadow area until the voltmeter 548 indicates zero volts if the meter 548 does not already so indicate. Thirdly, adjust the detector 172 slowly toward the shadow area until the voltmeter 548 indicates a substantial voltage, such as 10 volts. This will now be the correct setting for the seam height top maximum. The same procedure is employed for all maximum settings. The second detector to be set is the seam height top minimum detector 168. Select and position in the inspection station 74 a container with minimum countersink depth. Open the switch 552 and close the switch 554 of the FIGURE 23. Adjust the detector toward the shadow area until the voltmeter indicates approximately 10 volts if it does not already so indicate. Next, adjust the detector 168 slowly away from the shadow area until the voltage on the voltmeter 548 drops to zero volts. This will be the correct setting for the seam height top minimum. The same procedure is now followed for all minimum settings.

The positioning of the seam height bottom maximum detector 200 and the seam height bottom minimium detector 196 is somewhat different from the foregoing procedure in that a black paper template is used instead of the shadow image of a container. In the case of the seam height bottom minimum limit, a piece of black paper is cut to approximately 2 inches wide and 62.5 times the seam height minimum dimension of the double seam. A tolerance of ±1/64" should be maintained on the length of the paper template. One end of the strip of paper is slowly moved under the seam height top maximum detector 172 until the voltmeter indicates approximately 10 volts with switch 552 of the FIGURE 3 in contact with the conductor 550. The strip is now taped to the ground glass screen 86 and the seam height bottom minimum detector 196 is adjusted. Engage the voltmeter 548 by moving the switch arm 558 of the Schmitt trigger 528 into engagement with the conductor 550 of the FIGURE 23. Adjust the detector 196 toward the shadow area until the voltmeter 548 indicates approximately 10 volts if it does not already so indicate. Next, adjust the detector 196 slowly away from the shadow area (actually the black paper template) until the voltage drops to zero volts. This is the proper setting for the seam height bottom minimum detector 196. Before the seam height bottom limits are set the seam roller 100 must be shimmed approximately 0.030" away from the upper chuck 94 so as to admit light to the detectors.

There is no established dimension for the given amount of droop at the side seam and the operator's experience will be relied upon for the initial setting. The droop detector is the detector 204 positioned in the area immediately below the seam height bottom maximum detector 200. Additional operating experience with the invention will result in the determination of precise and accurate setting for all of the detectors set forth.

The compression spring 386 of the FIGURE 12 urging the seam roller 100 into engagement with the double seam 98 or the upper chuck 94, should be set at approximately 38 pounds which will produce a roll force on the double seam 98 of approximately 19.25 pounds. A base plate spring (not shown but associated with the lower chuck 90) is set to exert a 14 pounds upward axial clamping force to the container in the inspection station 74.

Before commencing operation of the machine for a run, air would be admitted to the conduit 412 shown in the FIGURE 13 so as to permit a moderate stream of air to blow on the double seam 98. This keeps the seam 98 free from dust particles which may otherwise cause false rejects.

The apparatus is now ready for operation. The device is started and a supply of containers 30 are loaded in the delivery channel 36 and advanced by the delivery auger 34. As a container 30 reaches a notch 48 of the delivery turret 40, the container 30 will enter the notch 48 and be indexed toward the inspection station at 74. Since no containers are available at the rejected containers channel 70 of the FIGURE 1 or the accepted containers channel 66, the gate 56 and 56' will be in its reject position. When the machine is operating with no containers, the result will be a signal to the shift register 640 of the FIGURE 24, which is similar to that resulting from a defective container. That is, the conductor 712 will carry a logic "1" and the conductor 710 will carry a logic "0." Under these conditions, the air motor pulser operating relay coil 680 will be deenergized. When the relay coil 680 is caused to be deenergized, it results in a pulse being delivered to the solenoid coil 686 on the air motor 4-way valve. This positions the gate 56 and 56' controlled by the piston rod 424 to the container reject position. As long as the conductor 712 from the OR circuits 626 and 628 carries a logic "1" and the conductor 710 from the inverter 638 carries a logic "0," the driver 676 controlling the relay coil 680 will maintain the relay coil 680 in its deenergized state. The gate 56 and 56' will thus remain stationary when no containers are being advanced.

If containers are being advanced in the system, the logic on the conductors 710 and 712 will reverse by the inspection and testing of the first acceptacle container. Under these conditions, the conductor 710 will indicate a logic "1" and the conductor 712 will indicate a logic "0." The testing of prior defective containers will not change the logic from the logic present when no containers are being advanced.

When the logic in the conductors 710 and 712 has been reversed as set forth (the conductor 710 now indicates a logic "1" and the conductor 712 indicates a logic "0"), the driver 676 is activated so as to energize the pulser relay coil 680. The air motor pulser 682 in turn causes a pulse to be sent through solenoid coil 688. This results in the free spool in the 4-way valve to be shifted to the other end of its travel at which it causes air to be delivered to the other end of the air motor piston 694 resulting in the repositioning of the gates 56 and 56' to pass the accepted or within tolerance container into channel 66. As noted in the FIGURE 1, the container after being inspected is not immediately discharged. In fact, the container, if to be rejected, would not be rejected until the second indexed position passed the inspection position 74. The reject information is stored in the shift register 640 of the FIGURE 24 as set forth and the shift register 640 would be of the type having two stages of storage and the information could be shifted from stage to stage by an advance pulse on the conductor 706 generated by the closing of the normally open contacts associated with the relay 584 of the FIGURE 25 and under control of the timers B and C. The foregoing timers are actuated at times during the inspection cycle as shown by the FIGURE 9.

Assume the information has been stored in the shift register 640 that a defective container has just been inspected. Subsequently, the defective container is indexed to a position in the delivery turret 40 just before the gate 56 and 56'. Before the defective container is indexed a second time after inspection, the normally open contacts associated with the relay 584 of the FIGURE 25 will close and a short pulse on the conductor 706 will step the shift register 640 of the FIGURE 24. The shift register 640 then generates an output to the driver circuit 676 which ultimately results in an actuation of the gate 56 and 56' so that the defective container is eased into the rejected channel 70. It will be intuitively clear that if delivery turrets having greater or lesser storage positions are employed, the shift register 640 may be easily constructed to accommodate the greater delay or the lesser delay between inspection of a defective container and actual rejection of the defective container.

Returning again to the logic associated with the OR circuits 626 and 628 and the inverter circuit 710 to the shift register 640 shown on the FIGURE 24, the "acceptable container" logic on the conductor 712 (a logic "0") and on the conductor 710 (a logic "1") will remain until a defective container is tested or when no containers are present in the inspection pocket of the inspection station. As long as this logic remains unchanged, the driver circuit 676 will keep the air motor pulser operating relay coil 680 energized indicating acceptable containers within the tolerances set forth.

When a defective container or an empty space is inspected, the logic on the conductor 710 will change back to a logic "0" and on the conductor 712 a logic "1." This change in logic turns off the driver circuit 676 so that the relay coil 680 is deenergized. This results in a pulse being sent through solenoid coil 686 of the 4-way valve. This causes the free spool in the valve to be shifted to its opposite end of travel so that the air motor piston 694 is actuated in the opposite direction. The connecting rod 424 through other linkage, will position the gate 56 and 56' in the reject position. As long as defective containers or empty spaces only are inspected, the logic on the conductors 710 and 712 will remain unchanged. However, the next acceptable container will reverse the logic on the conductors 710 and 712 and through the circuitry associated therewith, the gate 56 and 56' will assume a position so as to permit the acceptable container to enter the accepted or within tolerance channel 66 as illustrated in the FIGURES 1 and 5.

As the containers to be inspected are advanced by the delivery auger 34 and the indexing turret 40, they ultimately reach a position above the lower chuck 90 as illustrated in the FIGURE 14 and drop into the circular stop 92. The lower chuck 90 now commences to rise as dictated by the cam follower 106 following in the cam groove 112 of the cam 110, symbolically illustrated in the FIGURE 2. As the container 30 to be inspected continues to be elevated, the timer A shown on the FIGURE 25 is momentarily closed and if the illumination source 76 of the FIGURE 1 and the photoheads A and B of the FIGURE 25 are operating, then the driver circuit 696 will not cause the normally closed contacts of the relay 700 to open. In the event of an illumination failure, the inputs on the conductors 594, 596 and 598 will all indicate no light and the AND circuit 600 will produce an output to open the contacts associated with the relay 700 when the timer A is momentarily engaged.

Assuming that the illumination check has shown that illumination is present, then the container to be inspected would assume the position shown in the FIGURE 15 wherein the container end 32 is in substantial engagement with the upper chuck 94 and the lower flange of the container has engaged the circular stop 92 of the lower chuck 90. It will be understood that the container is rotated and inspected at substantially high speed since in the preferred embodiment of the invention, 50 containers per minute were inspected or approximately one container each 1.2 seconds.

During the actual inspection, the portion of the double seam actually under inspection at the particular moment may assume a position with respect to the steam roller 100 and the upper chuck 94 as shown in the FIGURE 16. For the purposes of explanation, we will assume that the double seam 98 under inspection is acceptable and that the shadow or image of the double seam 98 is that shown at 98' of the FIGURE 3.

In the logic of the FIGURES 22, 23, 24 and 25, we will assume that zero volts in logic "0" and indicates light. Conversely, we will assume that —12 volts indicates a logic "1" and indicates no light. Applying this logic to the FIGURES 22 through 25, the photomultiplier tubes of the FIGURE 22, after having the high voltage applied by the high voltage source 56 and their sensitivity adjusted by the potentiometers 462 through 474 associated with the photomultiplier tubes #1 through #7, respectively, will indicate a logic "0" if light is to fall upon the detector for an acceptable container and a logic "1" if no light is to fall upon the detector for an acceptable container. The photomultiplier output is a negative current on its output conductor whenever the detector associated therewith is illuminated. For example, the photomultiplier tube #1 would be illuminated for an acceptable container and the negative current flows through the resistor 476 and to the emitter-follower 478, as shown. The purpose of the emitter-follower is to amplify the signal current so as to be able to actuate the subsequent Schmitt trigger circuits. The output from the emitter follower is conducted via conductor 508 to the Schmitt trigger 522 of the FIGURE 23. When properly adjusted, the output from the Schmitt trigger 522 will be zero volts for light falling on the detector 172 and approximately —12 volts when no light is falling on the detector 172.

Operation of the photomultiplier tubes #2, #3, #4, #5, #6, and #7 are substantially as that set forth for #1, i.e., light to a detector associated with a particular photomultiplier produces a negative current from the photomultiplier which is manifested at its associated Schmitt trigger as zero volts or a logic "0"; conversely, no light on the detector associated with a particular photomultiplier produces no output from the photomultiplier and this is manifested at its associated Schmit trigger by a voltage of approximately —12 volts or a logic "1."

As shown in the FIGURE 23, each of the minimum tolerances that are measured, namely, the seam height top, seam height bottom and seam thickness are detectors which are normally dark. In order that the logic be simplified, the inverters 538, 542 and 546 are associated with the dark channels so that under normal conditions, logic "0's" are applied to the OR circuits 536, 540 and 544. An inverter 542 is coupled to the output of the Schmitt trigger 530 from the seam thickness maximum detector 184 but is not associated with the inspection criteria but is associated with an optical check as the container is elevated to the inspection station.

During the inspection, we will assume that the photoheads A and B of the FIGURE 25 are active in that a signal from the photohead A through the amplifier 666 and the Schmitt trigger 668, will inhibit the inspection cycle by conditioning the flip-flop 574 accordingly. As soon as the double seam 380 of the container under inspection has passed the illumination point, the photohead B will generate a signal to the amplifier 670 and the Schmitt trigger 672 to restart the inspection cycle by enabling the enable output of the flip-flop 574. With the flip-flop 574, the enable signal is available on the conductor 522 which is applied to the AND circuits 566, 568 and 570. During this time, the normally closed contacts of the relay 584 are in the position shown so that the flip-flops 576, 578, 580 and 590 can receive information indicative of the tolerance of the container under inspection. At this point, it may be well to point out that in the particular embodiment of the invention that was constructed and operated in accordance with the principles of the present invention, the container 30 under inspection rotated approximately twice during each inspection cycle of the machine, the inspection cycle of the machine being illustrated in the FIGURE 9 as commencing at 0° rotation of the cam shaft 114 and ending at 360° rotation.

If the container under inspection is within tolerance, then no outputs from the OR circuits 536, 540, 544 and the Schmitt trigger 534 are available to set their associated flip-flop when the enable pulse on the conductor 522 appears.

Conversely, if a detector should be illuminated for an acceptable container and is dark, or if a detector that should be dark for an acceptable container is illuminated, then an output from one or more of the OR circuits 536, 540 or 544 or from the Schmitt trigger 534 will be available and the flip-flops 576, 578 or 580 will be set upon occurrence of the enable pulse on the conductor 522. The output from the Schmitt trigger 534 on the droop channel is coupled directly to the flip-flop 590 since droop is determined from a single detector rather than a maximum and minimum as employed for sensing the other parameters.

For the purposes of explanation, we will assume that the seam thickness is too great and that the flip-flop 580 has been set. An output is now produced on the conductor 610 to the driver circuit 622, which will actuate the relay coil 634. The normally open contacts of the relay 634 will close and the reject counter (seam thickness) 646 will be actuated once indicating a container out of tolerance due to seam thickness.

In addition, the signal on the conductor 612 from the flip-flop 580 to the OR circuit 628 of the FIGURE 24 will reverse the logic on the conductors 710 and 712 so that the shift register 640 now stores information concerning the position in the indexing turret of a rejected container. At approximately 300°, as shown on the FIGURE 9, the normally open contacts of the relay 548 are actuated so that a pulse is generated on the conductor 706 to advance the shift register 640 and also a signal on the conductor 708 to permit an output from the AND circuit 710 to set the total counter flip-flop 592 of the FIGURE 23. The total counter flip-flop 592 is set only once during each container inspection cycle although the container under inspection may revolve more than a single revolution. The output from the total counter flip-flop 592 on the conductor 654 will actuate the relay coil 658 of the FIGURE 24 by providing sufficient drive to the driver 656. The contacts of the relay 658 will momentarily close, as it does for each container inspected, to actuate the total containers inspected counter 650 by a single advance count. Although the container may have been a reject container, it is still counted by the total containers inspected counter 650.

Next, the normally closed contacts of the relay 584 again close so as to reset the flip-flops 576, 578, 580 and 590 and the timer D momentarily closes so as to reset the flip-flop 574 from the reset circuit 674.

Lastly, the knock-out pad 260 of the FIGURE 17 is actuated due to the downward movement of the shaft 132 so that the seam roller 100, as viewed in the FIGURES 16 and 17, is moved slightly rightwardly so as to permit the double seam 98 just inspected to leave the inspection station 74. It will be recalled that the seam roller 100 was biased in a direction toward the upper chuck 94. The container 30 just inspected, rides down with the lower chuck 90 and is indexed to either the reject channel or the within tolerance channel, as appropriate.

In the particular example set forth, the container was a reject due to improper seam thickness and this information remains stored in the shift register 640 so that the gate 56 and 56' can be actuated as the reject container approaches the reject channel 70. As soon as the next subsequent container is inspected, a pulse will appear on the conductor 706 from the FIGURE 25 to the shift register 640 of the FIGURE 24 which result in a signal to the driver 676 to actuate the gate 56 and 56' to its reject position. Consequently, the reject container is rejected along the channel 70 as shown in the FIGURE 1. If the next container is defective and is to be rejected or if no containers are advanced, then the gate 56 and 56' remains in the reject position. If, however, the next container to be inspected is within tolerance, then the gate 56 and 56' will be driven to its position shown in the FIGURE 1 so that the acceptable container can be advanced to the accepted channel 66.

Thus, the present invention may be embodied in other specific forms without departing from the spirit and the essential characteristics of the invention. Although the invention has been illustrated and discussed with reference to the inspection of the double seam of a container, it will readily be understood by those skilled in the art that the invention is easily adaptable for the inspection of most any surface capable of reflecting a shadow or image to the ground glass screen of the optical comparator.

What is claimed is:

1. Apparatus for determining the conformity of a surface to a predetermined standard comprising means for projecting an optical image of the surface to a screen, sensing means communicating with said screen for detecting the optical condition of said screen at selected areas, said sensing means comprising a plurality of light pipe means adjacent said selected screen areas for indicating the optical condition of said screen areas at a point remote therefrom, and means coupled to said sensing means for determining, on the basis of the optical condition of said screen at the selected areas, the conformity of the surface to the standard.

2. Apparatus for determining whether a surface falls between predetermined limits comprising means for projecting an optical image of the surface on a generally smooth continuous surface of a screen, optically responsive sensing means communicating with said screen and defining the limits of acceptable surfaces, and means coupled to said optically responsive sensing means for yielding a determination based on the optical condition of said optically responsive sensing means.

3. Apparatus for determining whether a surface falls between a minimum and a maximum limit comprising means for projecting an optical image of the surface on a screen, a first group of optically responsive sensing means communicating with said screen and defining the minimum limit, a second group of optically responsive sensing means communicating with said screen and defining the maximum limit, and means coupled to both of said groups for determining whether the surface falls between the minimum and the maximum limit.

4. Apparatus for determining whether the double seam of a container is within tolerance comprising means for projecting an optical image of the seam on a screen, a first group of optically responsive detectors communicating with said screen and defining the minimum tolerance, a second group of optically responsive detectors communicating with said screen and defining the maximum tolerance, and means for combining the outputs of all of said detectors for deriving a signal indicative of the conformity of the seam to the tolerance.

5. Apparatus for determining whether the double seam of a container is within tolerance comprising means for advancing containers to an inspection station, means for rotating the container at the inspection station, means for optically projecting an image of the rotating double seam to a screen, a first group of optically responsive detectors communicating with said screen and defining the minimum tolerance, a second group of optically responsive detectors communicating with said screen and defining the maximum tolerance, and means for combining the outputs of all of said detectors for deriving a signal indicative of the conformity of the seam to the tolerance.

6. Apparatus for manipulating containers having ends formed thereon by a double seam, comprising an inspection station, means for advancing containers toward said inspection station and halting advancement when a container is aligned with said inspection station, first and second rotatable container extremity engaging means, means for serially axially moving the advanced containers to said inspection station during the halting of the advancement thereof, including said first container extremity engaging means and means mounting said first container extremity engaging means for axial movement with respect to the containers, means extending through said second extending through said second container extremity engaging means for removing containers from said station for continued advancement, and drive means operatively connected with both said first extremity engaging means and said means for removing for imparting axial movement thereto.

7. Apparatus for manipulating containers having ends formed therein by a double seam, comprising an inspection station, means at said inspection station for inspecting the contour of the double seam of containers, means for elevating and rotating containers at said inspection station for inspection of the contour of the double seam by said means for inspecting during the rotation thereof and means cooperating with said inspection station for removing containers from said means for inspecting the contour of the seam.

8. An inspection station comprising a rotatable upper chuck and a rotatable lower chuck for cooperatively positioning and rotating a container whose double seam is under inspection, means cooperating with said upper chuck for maintaining a portion of a double seam in a preselected position for inspection, and means cooperating with said upper chuck and said lower chuck for removing containers from the inspection station, including knock-out pad means extending through the upper chuck for engagement with an upper container end, and vertical drive means for vertically moving said lower chuck and knock-out pad means with respect to said upper chuck.

9. An inspection station comprising an upper chuck and a lower chuck for cooperatively positioning a container whose double seam is under inspection, a seam roller adjacent said upper chuck and in engagement with said upper chuck in the absence of containers at said inspection station and in engagement with a double seam of a container during the presence of a container, means for optically projecting the image of portions of a double seam and said seam roller of a container under inspection, means for rotating a container under inspection, and means cooperating with said upper chuck, seam roller and lower chuck for removing containers from the inspection station.

10. An inspection station comprising an upper chuck for receiving a container end joined to a container body by a double seam, a lower chuck for elevating containers to said upper chuck, means adjacent said upper chuck for peripherally engaging portions of a double seam and defining an inspection area between said means for peripherally engaging and the double seam, means for rotating a container under inspection about an axis thereof, and means concentric with said upper chuck for removing containers from the inspection station.

11. The combination as defined in claim 10 including means on said lower chuck for aligning containers on said chuck for elevation to said upper chuck.

12. An inspection station comprising an upper chuck for receiving a container end joined to a container body by a double seam, a lower chuck for elevating containers to said upper chuck, means adjacent said upper chuck for peripherally engaging portions of a double seam and defining an inspection area, means for rotating a container under inspection about an axis thereof, means concentric with said upper chuck for removing containers from the inspection station, and means on said lower chuck for aligning containers on said chuck for elevation to said upper chuck, said means for aligning being a circular depressed stop for engaging a container body flange in the case of an open container and a double seam of a container end in the case of a closed end.

13. An inspection station comprising an upper chuck for receiving a container end joined to a container body by a double seam, a lower chuck for elevating containers to said upper chuck, a seam roller in peripheral engagement with said upper chuck in the absence of containers in said chuck and in peripheral engagement with a double seam of a container during the presence of a container in said chuck, the peripheral engagement of a double seam and said seam roller defining an inspection area, means for rotating a container under inspection, and means concentric with said upper chuck for removing containers from the inspection station.

14. The combination as defined in claim 13 wherein said upper chuck and said seam roller rotate about substantially parallel shafts.

15. The combination as defined in claim 13 wherein said seam roller includes a circumferential groove for permitting subsequent optical inspection of the maximum seam thickness of a double seam.

16. The combination as defined in claim 13 including means to resiliently urge said seam roller toward said upper chuck.

17. The combination as defined in claim 13 including a peripheral shoulder formed on said seam roller for engaging the lower edge of a double seam under inspection.

18. The combination as defined in claim 13 including a knock out pad concentric with said upper chuck for removing containers from the inspection station.

19. An inspection station comprising an upper chuck for receiving a container end joined to a container body by a double seam, a lower chuck for elevating containers to said upper chuck, a seam roller in peripheral engagement with said upper chuck in the absence of containers in said chuck and in peripheral engagement with a double seam of a container during the presence of a container in said chuck, the peripheral engagement of a double seam and said seam roller defining an inspection area, means for rotating a container under inspection, and a rotatable and axially movable shaft concentric with said upper chuck for removing containers from the inspection station.

20. The combination as defined in claim 19 including a circular pad formed on the lower end of said shaft for minimizing damage to containers being removed.

21. The combination as defined in claim 19 including means for synchronizing the action of said lower chuck in elevating containers and said rotatable and axially movable shaft for removing containers, to and from the inspection station.

22. The combination as defined in claim 19 including means for periodically and resiliently urging said shaft toward a container for removal.

23. An inspection station comprising an upper chuck for receiving a container end joined to a container body by a double seam, a lower chuck for elevating containers to said upper chuck, a seam roller in peripheral engagement with said upper chuck in the absence of containers in said chuck and in peripheral engagement with a double seam of a container during the presence of a container in said chuck, the peripheral engagement of a double seam and said seam roller defining an inspection area, and means for rotating a container under inspection, and means concentric with said upper chuck for removing containers from the inspection station, said seam roller rotating about a shaft substantially parallel to the shaft of rotation of said upper chuck and being resiliently urged thereagainst and further including a peripheral groove aligned with said inspection area and an adjacent shoulder for, respectively, permitting subsequent optical inspection of the maximum seam thicknes and for engaging the lower edge, of a double seam under inspection.

24. The combination as defined in claim 23 wherein said means for removing containers is a rotatable and axially movable shaft and positioned for resilient, periodic urging toward containers at the inspection station.

25. The combination as defined in claim 23 including means for optically transmitting an image of said inspection area of the double seam to an optical comparator.

26. The combination as defined in claim 25 including means for determining the presence of a side seam of a container having a double seam under inspection, in said inspection area.

27. The combination as defined in claim 25 including means coupled to said comparator for determining whether the double seam height top falls between a predetermined minimum and maximum limit.

28. The combination as defined in claim 25 including means coupled to said comparator for determining whether the double seam height bottom falls between a predetermined minimum and maximum limit.

29. The combination as defined in claim 25 including means coupled to said comparator for determining whether the double seam thickness falls between a predetermined minimum and maximum limit.

30. The combination as defined in claim 25 including means coupled to said comparator for determining excessive droop of a double seam.

31. The combination as defined in claim 23 including means for maintaining the inspection area free of extraneous matter.

32. Apparatus for examining the contour of a container for adherence to predetermined standards comprising an inspection station for exhibiting and rotating a contour under inspection, optical means, for optically projecting the contour to said optical means, said optical means including light pipe means for indicating the condition of the contour at a point remote from the projection thereof and electronic means coupled to said optical means and responsive to the optical condition of said light pipe means for determining whether the contour adheres to the predetermined standard.

33. Apparatus for determining whether the contour of a surface adheres to a predetermined standard comprising means for optically projecting the contour to a screen, sensing means positioned upon said screen and defining the tolerance of the contour to the standard, control means, and bistable means under control of said control means for causing said bistable means to assume a first stable condition indicating a contour within the standard and a second stable condition indicating a contour exceeding the standard.

34. The combination as defined in claim 33 including means for resetting said bistable means.

35. The combination as defined in claim 33 wherein said control means is a flip-flop.

36. The combination as defined in claim 35 including a first channel for rendering said flip-flop operative and a second channel for rendering said flip-flop inoperative.

37. Apparatus for determining whether the contour of an object adheres to a predetermined standard comprising means responsive to the maximum and minimum limits of the standard, bistable means coupled to said means responsive and resettable to a first state indicating the contour is within both maximum and minimum limits and to a second state indicating the contour is without the limits, control means, and means separate from said means responsive coupled to said control means and said bistable means for conditioning said bistable means, independently of said means responsive, to assume one of its states as indicated by said means responsive.

38. The combination as defined in claim 37 wherein said means responsive is a first photomultiplier responsive to the contour of the maximum top seam height of a double seam of a container and a second photomultiplier responsive to the contour of the minimum top seam height.

39. The combination as defined in claim 37 wherein said means responsive is a first photomultiplier responsive to the contour of the maximum seam thickness of a double seam of a container and a second photomultiplier responsive to the contour of the minimum seam thickness.

40. The combination as defined in claim 37 wherein said means responsive is a first photomultiplier responsive to the contour of the maximum bottom seam height of a double seam of a container and a second photomultiplier responsive to the contour of the minimum bottom seam height.

41. The combustion as defined in claim 37 wherein said means responsive is a photomultiplier responsive to the contour of the seam droop of a double seam of a container.

42. Apparatus for determining whether a plurality of input signals meet established criteria comprising a plurality of electrical channels selectively coupled to receive said plurality of input signals, each channel including means for determining whether its input signals fall within the established criteria, bistable means in addition to said means for determining and coupled to each of said channels and settable to a first state indicating compliance with the criteria and to a second state indicating non-compliance with the criteria, and means separate from said channels for conditioning said bistable means to indicate compliance or non-compliance independently of said plurality of input signals.

43. The combination as defined in claim 42 wherein said channels are four in number and including detecting means coupled, respectively, to each of said channels for indicating to each of said channels whether a criterion detected by said channel adheres to the established criteria.

44. The combination as defined in claim 43 including counting means coupled to each of said bistable means for indicating non-adherence to the criterion established for the channel.

45. The combination as defined in claim 43 including additional detecting means for controlling said means for conditioning.

46. Apparatus for determining whether the double seam of a container formed by the joining of a container body having a side seam and a container end adheres to a predetermined standard comprising an inspection station, means for elevating a container to said inspection station, means for optically projecting the image of a double seam of a container to a screen, a plurality of optical detectors selectively positioned upon said screen to indicate whether the double seam falls within the tolerance permitted by the standard, a plurality of electrical channels including at least a photomultiplier selectively coupled to said detectors, bistable means coupled to each of said channels and settable to a first state indicating the double seam to be within tolerance and to a second state indicating the double seam to be out of tolerance, control means coupled to each of said bistable means for permitting said bistable means to assume one of its states, and means controlled by the side seam of a container for disabling said control means.

47. The combination as defined in claim 46 including means for serially advancing a group of containers to and from said inspection station and means under control of said bistable means for recording the position of a container in the group of containers not adhering to the standard.

48. The combination as defined in claim 47, wherein said means under control of said bistable means is a shift register.

49. The combination as defined in claim 48 including means responsive to the output of said shift register for rejecting containers from the group of containers at a reject station.

50. A method for determining the conformity of a surface to a predetermined standard comprising the steps of rotating the surface at an inspection station, projecting an image of the surface to a screen, positioning a plurality of detectors on the screen to define a maximum and a minimum tolerance for the conformity of a surface under investigation, and sensing the output of the detectors to determine whether the surface conforms to the standard.

51. The method as defined in claim 50 including the step of counting the total surfaces inspected and the surfaces not conforming to the standard.

52. A method for determining the conformity of a surface to a predetermined standard comprising the steps of rotating the surface at an inspection station, projecting an image of the surface to a screen, positioning a plurality of detectors on the screen to define a maximum and a minimum tolerance for the conformity of a surface under investigation, sensing the output of the detectors to determine whether the surface conforms to the standard, and selectively disabling the sensing step during the passage of known irregularities at the inspection station.

53. A method for determining the conformity to a standard of the double seam of a container formed by the joining of a container end to a container body having a side seam comprising the steps of rotating the container to expose the double seam to an inspection area, projecting an image of the double seam at the inspection area to a screen, sensing the light and shadow areas of the image on the screen, and determining from the sensed light and shadow areas the conformity of the double seam to the standard.

54. A method for determining the conformity to a standard of the double seam of a container formed by the joining of a container end to a container body having a side seam comprising the steps of rotating the container to expose the double seam to an inspection area, projecting an image of the double seam at the inspection area to a screen, sensing the light and shadow areas of the image on the screen, applying the sensed light and shadow areas to electrical channels, and coupling a bistable device to each channel for indicating, according to the sensed light and shadow areas, the conformity of a double seam to a standard.

55. The method as defined in claim 54 including controlling the bistable device so as to inhibit the devices during passage of the side seam in the inspection area.

56. The method as defined in claim 54 including the step of counting the number of times the bistable devices indicate non-conforming containers.

References Cited

UNITED STATES PATENTS

| | | | |
|---|---|---|---|
| 3,012,665 | 12/1961 | Hanot | 209—80 |
| 3,101,848 | 8/1963 | Uhlig | 209—111.7 |
| 3,265,901 | 8/1966 | Schneider | 209—111.7 |
| 3,292,785 | 12/1966 | Calhoun | 209—11.7 |
| 2,682,802 | 7/1954 | Fedorchak | 209—111.7 |

M. HENSON WOOD, Jr., Primary Examiner

R. A. SCHACHER, Assistant Examiner

U.S. Cl. X.R.

73—52; 198—19; 209—111.7; 250—202